United States Patent
D'Hooge et al.

(12) 
(10) Patent No.: US 6,636,354 B1
(45) Date of Patent: Oct. 21, 2003

(54) MICROSCOPE DEVICE FOR A COMPUTER SYSTEM

(75) Inventors: Herman D. D'Hooge, Hillsboro, OR (US); Steven B. McGowan, Portland, OR (US); James M. Okuley, Portland, OR (US); Lenka M. Jelinek, Portland, OR (US); Geoff W. Peters, Portland, OR (US); Mark R. Leavy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/568,391

(22) Filed: May 10, 2000

Related U.S. Application Data

(63) Continuation-in-part of application No. 09/474,380, filed on Dec. 29, 1999.

(51) Int. Cl.$^7$ .......................... G02B 21/06; G02B 21/00
(52) U.S. Cl. .................. 359/385; 359/368; 359/390
(58) Field of Search .................. 359/362–363, 359/368–390, 900; 600/117–118, 178–180

(56) References Cited

U.S. PATENT DOCUMENTS

| | | | | |
|---|---|---|---|---|
| 5,306,576 A | * | 4/1994 | Sasaki ........................ | 429/98 |
| 5,844,484 A | * | 12/1998 | Fujiuchi et al. .......... | 340/572.1 |
| 5,986,813 A | * | 11/1999 | Saikawa et al. ............ | 359/630 |
| 6,372,498 B2 | * | 4/2002 | Newman et al. ............ | 435/455 |
| 6,432,852 B1 | * | 8/2002 | Hara ........................... | 501/17 |

FOREIGN PATENT DOCUMENTS

| | | | | |
|---|---|---|---|---|
| EP | 43 133 | * | 1/1982 | ................. 359/385 |

* cited by examiner

Primary Examiner—Thong Nguyen
(74) Attorney, Agent, or Firm—Trop, Pruner & Hu, P.C.

(57) ABSTRACT

A computer microscope system having a housing, imager circuit including an imaging device and support circuits, and optical unit is coupled to a computer system running a microscope control program to provide convenient imaging of objects at one or more magnification levels. The microscope control program provides control and user interface between the microscope, computer hardware and the user, thus allowing for easy Manipulation of the microscope (and the images generated) by the user.

9 Claims, 33 Drawing Sheets

MICROSCOPE DEVICE FOR A COMPUTER SYSTEM

RELATED APPLICATION

This application is a continuation-in-part of U.S. patent application Ser. No. 09/474,380 filed Dec. 29, 1999.

BACKGROUND

Microscopes are generally known in the scientific fields as instruments for viewing features on objects that are too small for viewing with the naked eye. The typical microscope is illustrated in FIG. 1. Microscope 1 consists of an optical unit 2 and base 4 that supports the optical unit 2. The base 4 also supports a stage 6 upon which an object 8 may be placed for viewing by a user of the microscope 1. Optical unit 2 includes an eyepiece 10 (also called an ocular), viewing cylinder 12 and magnifying lens unit 14. The magnifying lens unit 14 is positioned at the bottom of viewing cylinder 12 in order to receive light reflected from the object 8. The magnifying lens unit 14 typically includes two or more "objective" lenses of differing magnification levels, and the magnifying lens unit 14 may be rotated by the user so that one of the objective lenses is placed in an image path of the optical unit 2 to select a desired magnification level. Viewing cylinder 12 is typically a hollow cylinder that serves as an enclosed area for transmission of light from the selected objective lens of the magnifying lens unit to the eyepiece 10. Eyepiece 10 may include a magnifying lens to further magnify the image received from the magnifying lens unit 14, and to allow light rays to pass through the eyepiece into the exterior environment. The user may position an eye behind the eyepiece 10 to view a magnified image of the object 8.

The prior art microscope has been used in conjunction with a computer to allow the magnified image to be electronically viewed and stored on a computer system. One such system places a charge coupled device (CCD) imager behind the eyepiece 10 of the prior art microscope 1. The CCD imager (and associated electronics) is coupled to a computer system to allow the acquisition of digital images representing the magnified image of object 8. The microscope 1 itself is not altered.

These prior art CCD-microscope combinations have generally been highly technical in implementation (designed for use by research laboratories) requiring specific knowledge of computer systems and imaging in implementing the system. They are generally not usable by people without advanced technical knowledge (for example, children of small age). Such people would, however, be fascinated by the ability to see the microscopic features on various objects. Moreover, as computer systems have become a part of more households and educational facilities, it has become desirous to design costsensitive, computer-related devices and applications that will be appealing to children (and easily usable by teachers). Children are generally interested in the use of computer systems, and thus to be able to appeal to this interest with computer-related educational applications may be useful in enhancing educational opportunity and development.

DETAILED DESCRIPTION

Figure 1:
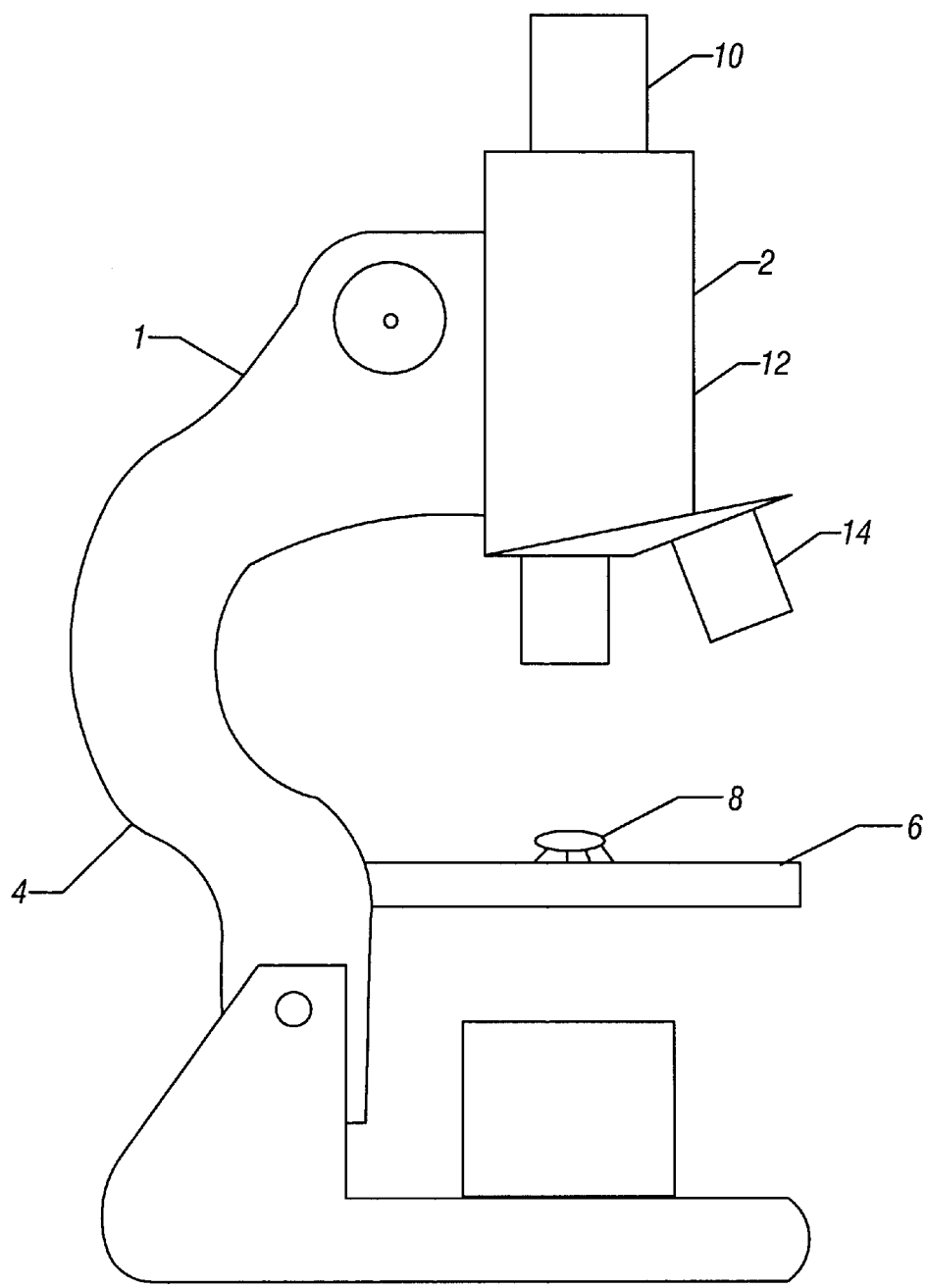
FIG. 1 shows a prior art microscope.

According to the present invention, an electronic or "computer" microscope device for use with a computer system may be implemented and used as described herein. The electronic microscope is advantageously designed to be easily implemented and used by non-technically trained people, for example, children, in conjunction with the data storage and manipulation facilities of a computer system. According to the present invention, the computer microscope may be an "integrated" package of viewing equipment and software, allowing for ease of use and installation. The combination of the computer system with the microscope will generate enthusiasm in children to use the microscope to explore the nature of various objects around them, enhancing the education of such children. The combination will also be a popular source of entertainment. The microscope may be implemented in a cost-effective manner.

As used herein, the phrases "at least one" and "a number of" refer to one or more items, while the phrase "a plurality of" refers to more than one item. Also, the terms "coupled" and "connected" as used in the context of electrical devices denote an operative/electrical connection, and thus may include incidental well known items to facilitate such coupling or connection (such as connectors, drivers, transceivers, glue logic, and so forth). The reference numerals used herein are used consistently across all figures to refer to the same object when that object is shown in multiple figures.

Figure 2:
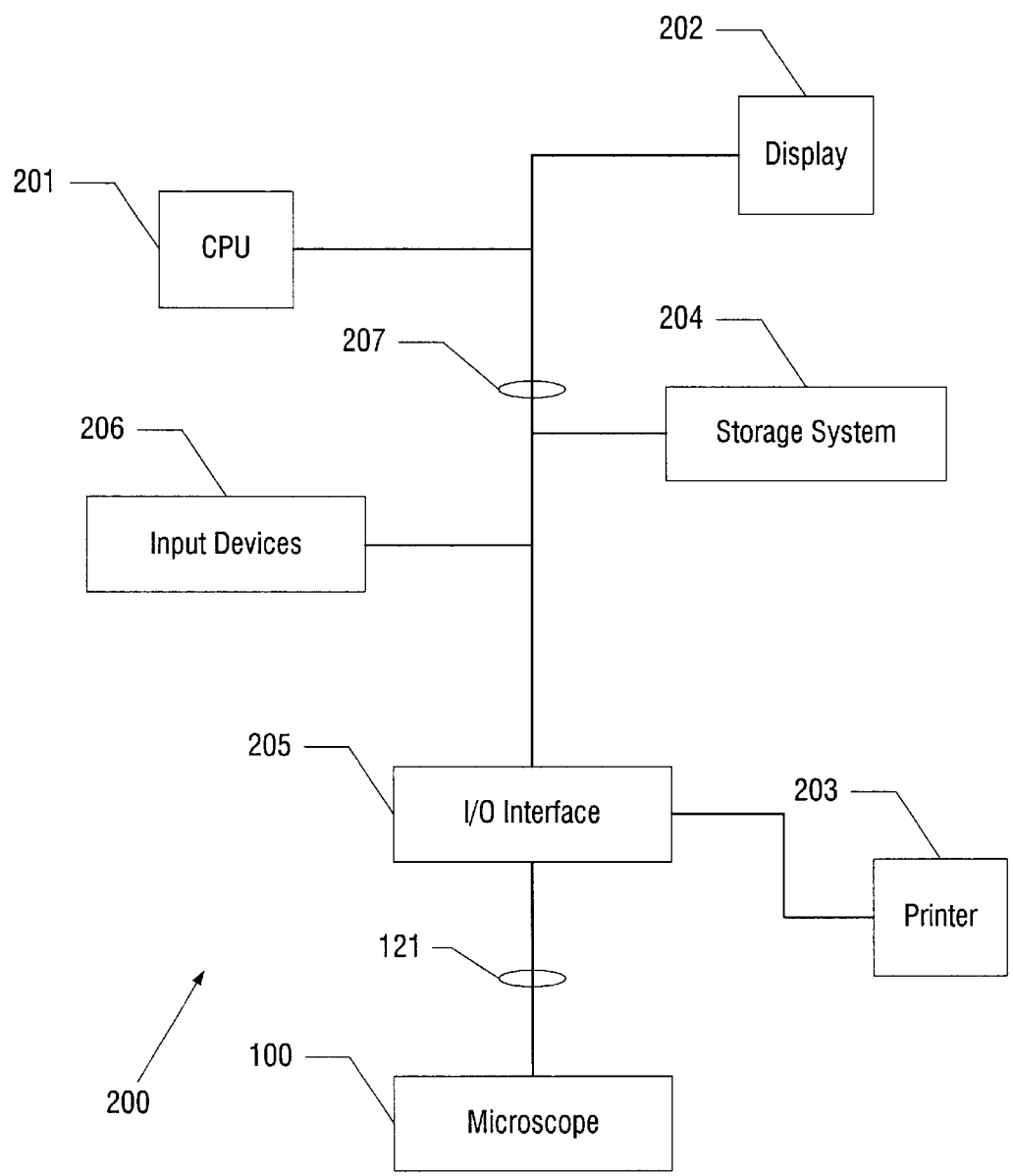
FIG. 2 shows a computer system in conjunction with an electronic microscope, according to the present invention.

FIG. 2 shows a first exemplary embodiment of an electronic microscope 100 in conjunction with an exemplary computer system 200, implemented according to the present invention. Electronic microscope 100 is coupled to the computer system 200 via cable 121, which may comprise a number of individual wires to carry signals between the computer system 200 and the microscope 100. Exemplary computer system 200 comprises a central processing unit (CPU) 201 (e.g., a microprocessor), a display 202 (e.g., cathode ray tube, liquid crystal display), input devices 206 (e.g., a keyboard or mouse), a storage system 204 (e.g., RAM, optical disks, magnetic disks) and a bus 207 to couple each of these components to each other. The electrical interface between the microscope 100 and the computer system 200 is formed via an Input/Output (I/O) interface 205, which may comprise any of the various well known interface formats, such as Universal Serial Bus (USB), serial interface, parallel printer interface, Peripheral Components Interconnect (PCI) interface, Industry Standard Architecture (ISA) interface, or other interface format. I/O interface 205 may also be coupled to bus 207. A printer 203 or other device for creating "hard copy" of images may also be included in computer system 200, connected to the bus 207, for example, via the I/O interface 205.

Figure 3:
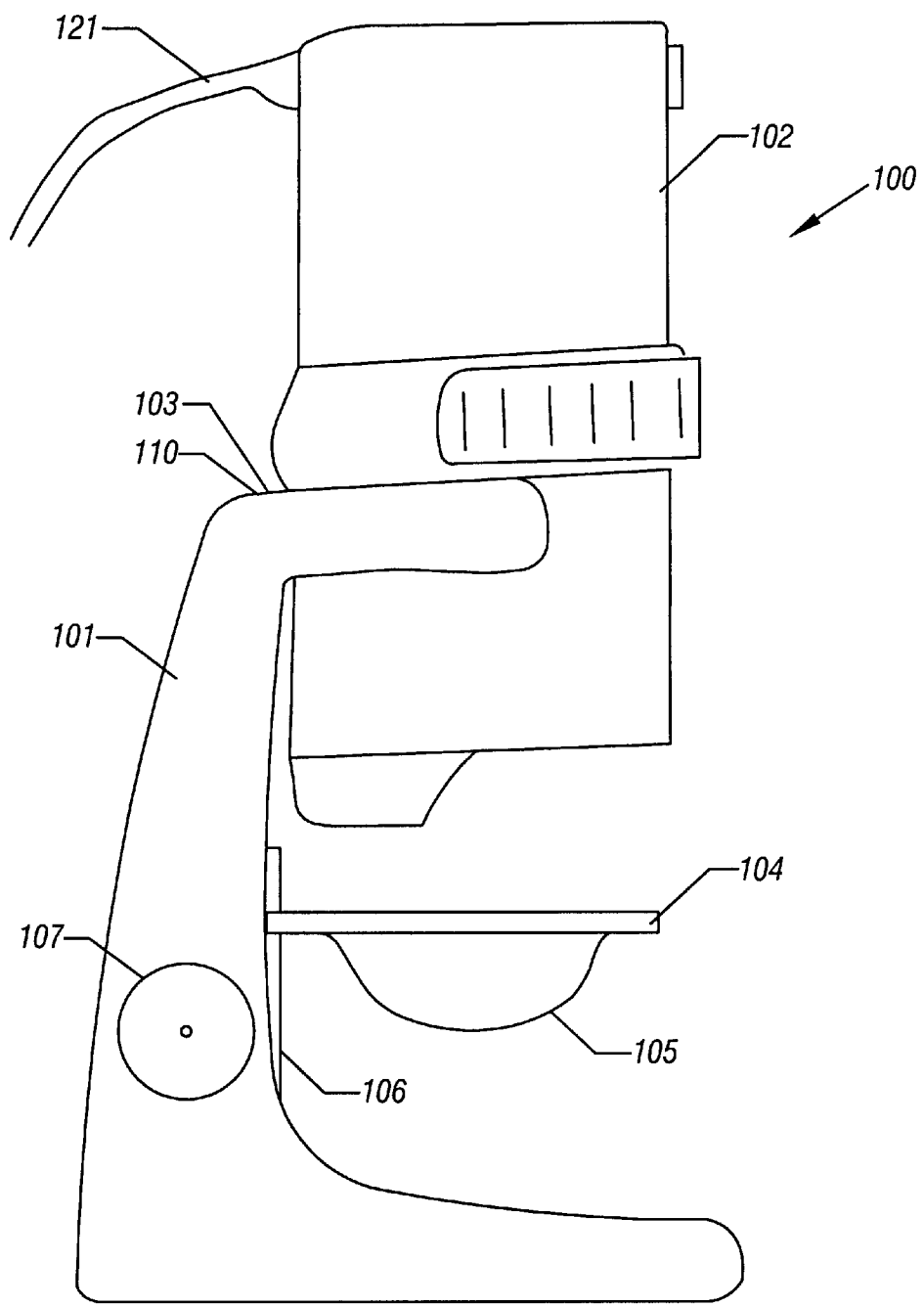
FIG. 3 shows a side view of the electronic microscope of FIG. 2, according to the present invention.

FIG. 3 illustrates the exemplary electronic microscope 100. Microscope 100 comprises a base 101 and an imaging unit 102. The imaging unit 102 is supported by an imager unit holder 110 that is part of the base 101, for example, by arms 103 that extend horizontally from the base 101. Arms 103 may be permanently connected to imaging unit 102 (such that the imaging unit 102 and base 101 are a single assembly), or may be detachably connected to the imaging unit 102, allowing the imaging unit 102 to be used without the base 101. The base 101 further includes a stage 104 positioned, for example, below the arms 103, such that the imaging unit 102 may obtain an image of objects placed on the stage 104 when the imaging unit is connected to arms 103. Stage 104 includes a light source 105 positioned on the bottom of the stage 104 to back illuminate objects on the stage 104. Stage 104 may be movable via a motion system 106. As shown in FIG. 3, the stage 104 is movable in the z-direction (i.e., vertically) via a manual motion system, for example, a knob 107 and tongue and groove members on the knob and the stage (not shown). Rotation of knob 107 thus causes stage 104 to move upwardly or downwardly (relative to the imaging unit 102), depending on the direction of rotation.

Light source 105 and other electrically powered devices in base 101 may be separately powered and controlled, for example via a power cord and switch. Alternatively, a power and/or control connection may be provided from the imaging unit 102, for example, via mating electrical contacts in the imaging unit 102 and base 101 (described further below).

Figure 4:
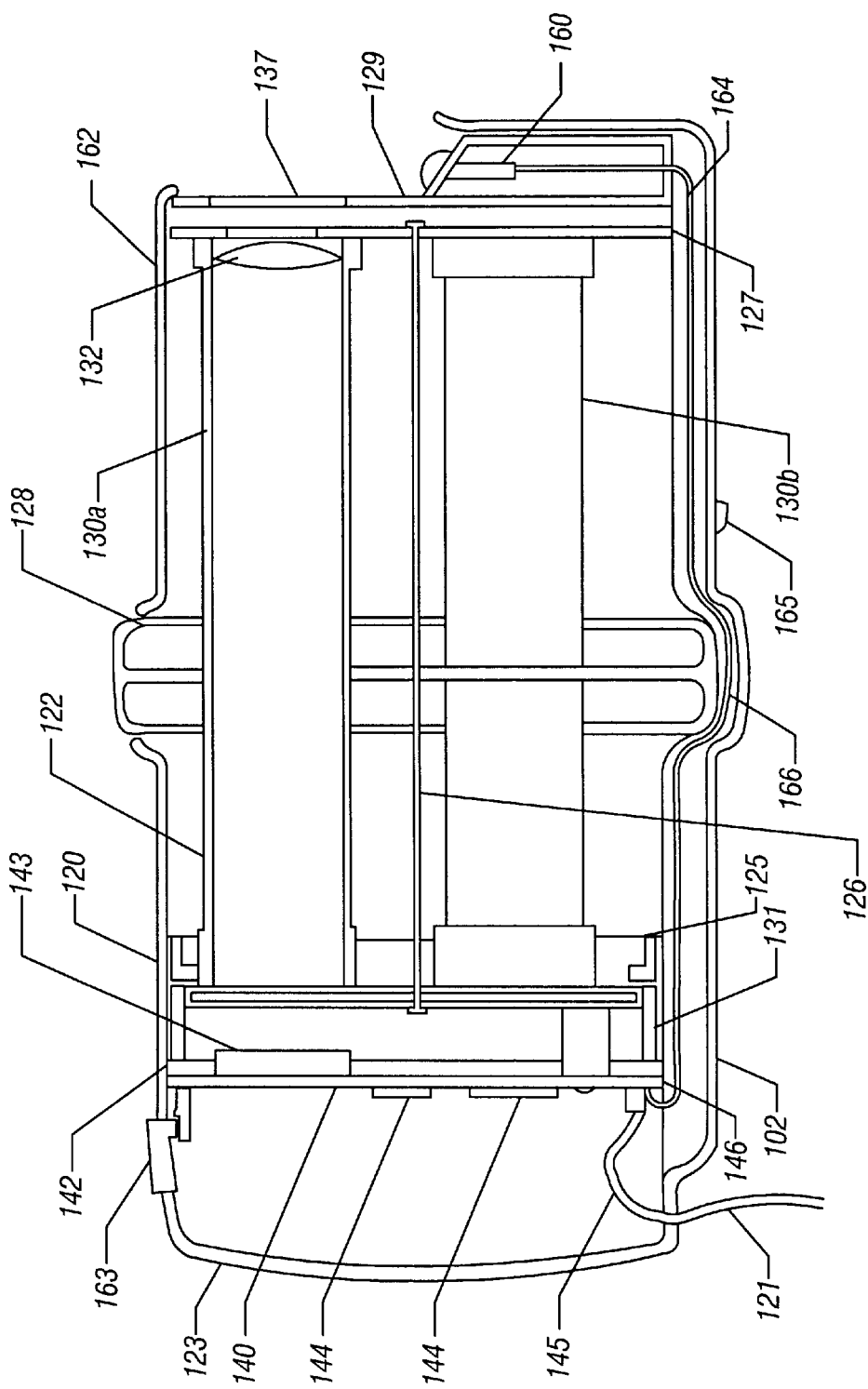
FIG. 4 shows a cross-sectional view of an imaging unit of the electronic microscope of FIG. 2, according to the present invention.

FIG. 4 shows a cross-sectional view of the exemplary imaging unit 102. Exemplary imaging unit 102 comprises a housing 120 which encloses various elements of the imaging unit 102. At a distal end 162 of the housing 120 is a covering plate 129 that includes a non-magnifying lens 137 which allows light to enter the housing 120 while protecting the interior of housing 120 from external elements (e.g., dirt, liquids). The housing 120 may be sealed to deter liquids from seeping into the imaging unit 102, which may be advantageous where the microscope 100 is intended for use with children, who are prone to accidents and spills. Cable 121 extends from a proximate end 123 of housing 120. Cable 121 comprises a number of wires 145 to provide communications and electrical connections between the imaging unit 102 and the computer system 200 (see FIG. 2). Alternatively, cable 121 may be replaced by a wireless connection (e.g., infrared or radio communication) to provide communication between the imaging unit 102 and the computer system 200 (power may be separately supplied).

Imaging unit 102 further comprises an optical unit 122, which is located toward the distal end 162 of the housing 120. Optical unit 122 includes a top plate 125 and a bottom plate 127, which are used to fix in place various optical elements of the optical unit 122. Optical unit 122 may be rotatably mounted within the housing 120, for example, via a rod 126 extending longitudinally through the housing 120 and connected to the bottom plate 127 and a connecting plate 131 (which does not rotate). Other means for rotatable connection can, of course, be used. Optical unit 122 further comprises a grip 128 that protrudes from the housing 120 and completely encircles the optical unit 122. Exemplary grip 128 allows a user to rotate the optical unit 122 about the rod 126.

The optical unit 122 will include a number of "optical paths" used to direct light towards imaging electronics. The exemplary optical unit 122 depicted in FIG. 4 includes three optical paths 130 (only two are shown in the cross-section of FIG. 4, individually labeled 130a and 130b), arranged equidistantly in optical unit 122. The multiple optical paths 130 may be used, for example, to provide different magnification levels to light which traverses each path. As such, each optical path 130 includes a number of lenses 132 to provide varying magnification levels and fields of view. In the present example, one lens 132 is used in optical path 130a, providing a 60× magnification level, while two lenses 132 (not shown) are used in optical path 130b to provide a 200× magnification level. The specific characteristics of the lenses 132 may be chosen to effectively implement the desired magnification levels, as is well known. Such lenses are available from Applied Image Group, Tucson, Ariz., or other optics sources. To provide for rotation of the optical paths, the top plate 125 of optical unit 122 interacts with connecting plate 131 to provide guidance and a "keying" system (not shown) to indicate proper alignment of an optical path with an imaging device (described below). Well known keying system embodiments may be used (e.g., rib-in-groove).

Imaging unit 102 further includes an imager circuit 140, positioned toward the proximate end 123 of the housing 120. Imager circuit 140 includes an imaging device 142 and support circuits 144 disposed on at least one printed circuit board 146. Imaging device 142 may comprise one of many electronic imaging devices commercially available and having a resolution size useful for generating images with a large field of view. One such device would be a VVL 6444 CMOS sensor provided by VLSI Vision, Scotland, which has a 320×240 pixel resolution. Imaging device 142 is positioned such that an imaging surface 143 of the imaging device 142 may be located behind one of the optical paths 130 of the optical unit 122, in order to receive light projected through the optical path 130, as described below.

Imaging device 142 is electrically connected to support circuits 144. Support circuits 144 are themselves electrically connected to the wires 145 of cable 121. Support circuits 144 may include transceivers, amplifiers, and a micro controller/microprocessor system or other control logic system (for example, a VVL CPIA 1.6 controller) in order to transmit image data produced by the imaging device 142 to computer system 200 via wires 145, and to receive control signals from computer system 200. Support circuits 144 may include other circuit elements as needed in order to enable clear, consistent communication between the imaging device 142 and the computer system 200 or to provide power and/or control to other electrical portions of the microscope 100. For example, support circuits 144 may include facilities to establish "plug and play" connections with the computer system 200. Support circuits 144 may also implement a removal detection circuit that determines whether the imaging unit 102 is mounted in the base 101, and can provide an indication that the imaging unit is mounted in the base 101.

Imaging unit 102 further includes a light-source 160, disposed at the distal end 162 of the housing 120. As depicted in FIG. 4, the light source 160 may be exposed to the exterior of housing 120, allowing the light source 160 to illuminate an object placed in front of the non-magnifying lens 137. Light source 160 may comprise any well known source of illumination, such as a lamp or LED. Light source 160 may receive power from the imaging circuit 140 via cable 164. Control of light source 160 in this example is via computer system 200, although a manual switch could also be used.

Imaging unit 102 may further include a switch button 163 disposed, for example, adjacent to circuit board 146 and extending out of housing 120. Switch button 163 may be used, for example, to allow manual sampling of image data, as will be further described below. Imaging unit 102 may further include electrical contacts 165 extending out from housing 120 and positioned to contact mating electrical contacts in the base 101. Electrical contacts 165 are electrically connected to the imager circuit 140 via wires 166. Electrical contacts 165 allow for power/control of components in the base 101 (e.g., the lamp 105) via the imager circuit 140 (and computer system 200) when the imaging unit 102 is mounted in the base 101. The removal detection circuit of the imager circuit 140 may use the electrical contacts 165 to determine whether the imaging unit 102 is mounted in the base 101.

Figure 5:
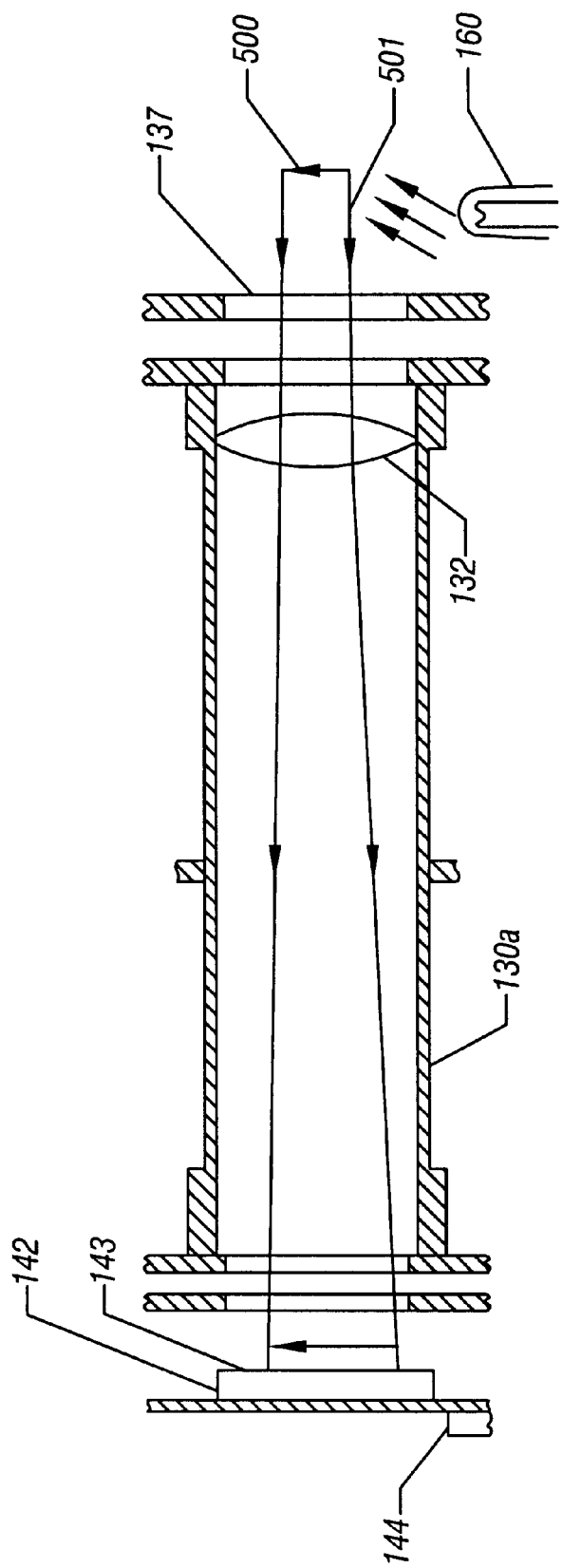
FIG. 5 shows a cross-sectional view of the imaging unit of FIG. 4 including a light ray diagram, according to the present invention.

The resulting operation of the exemplary imaging unit 102 will now be described with reference to FIG. 5, which shows a cut-away cross section of optical path 130a and imager circuit 140, and a light ray diagram of the imaging unit 102 being used for an illustrative imaging operation. Object 500 is placed in front of the imaging unit 102, and specifically in front of non-magnifying lens 137. Optical path 130a has been previously rotated such that it is located in line with imaging device 142. Object 500 may be illuminated via light source 160 to provide ample reflected light from the object 500 to obtain an image. Light rays 501 reflected from object 500 are received by non-magnifying lens 137 and passed through (without magnification) to the lens 132. Light rays 501 thus represent an image of the object 500.

Lens 132 magnifies the image of object 500 by a known amount (depending on the properties of the lens—in this case 60×) by deflecting the received light rays 501 as they travel through the lens 132. The deflected light rays 501 exit the lens 132, travel through the optical path 130a, and are received on the imaging surface 143 of imaging device 142. Since the light rays 501 have been deflected by lens 132, the image of object 500 perceived at the imaging surface 143 is larger than the size of object 500. Imaging device 142 performs an imaging operation (according to the type of imaging device used) to detect the light rays 501 and generates an electrical signal representing the magnified image at image surface 143. The electrical signal may then be conditioned/formatted by support circuits 144 (for example, adjusting color, white balance, brightness, and data compression) and transmitted via cable 121 to computer system 200 (see FIG. 2).

Microscope 100 may be constructed from materials such as plastics for durability and cost-savings. Microscope 100 may also be constructed to avoid sharp corners (which could cause injury). Since microscope 100 may be operated as a "hand held" device (i.e., without base 101), it is also advantageous to make microscope 100 as lightweight as possible.

Figure 6:
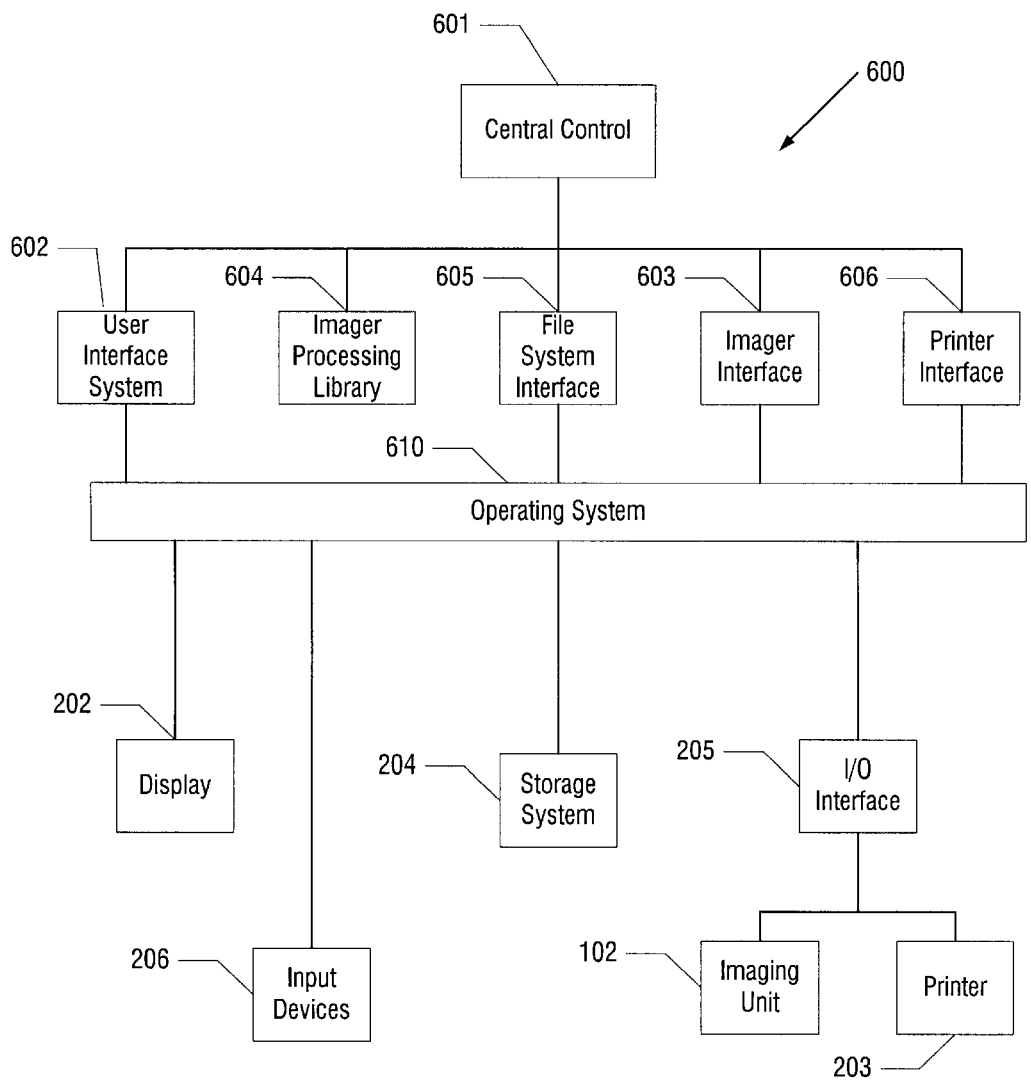
FIG. 6 shows a block diagram of a microscope control program, according to the present invention.

As mentioned previously, an exemplary use of the microscope 100 is in conjunction with a computer system 200. FIG. 6 shows a block diagram of various logical elements of an exemplary microscope control program 600 executed in the computer system 200 and used to control the microscope 100. The functionality described by FIG. 6 may be implemented, for example, via a software program written using any of the various well known computer languages (C++, Visual Basic, etc.), and loaded and/or executed from the storage system 204 (for example, from a CD or magnetic disk). The functionality of FIG. 6 is depicted in terms of various logical systems and interfaces, however the functionality described may be grouped in alternate arrangements of routines, modules, objects or other software structures, as is well known.

A central control unit 601 (which provides overall program and device control) is logically coupled to a user interface system 602, which provides the user with a display and allows the user to select features and functions provided by the control program 600 and the microscope 100. Central control unit 601 is further logically coupled to an imager interface 603, which provides communication between the imaging unit 102 of microscope 100 and the control program 600. Central control 601 is also logically coupled to a file system interface 605, which allows the user to store and retrieve image data (still images and multi-image "clips") using storage system 204, and an image processing library 604, which allows the user to perform various editing operations on images either received from microscope 100 or stored in storage system 204. Central control 601 is further logically coupled to a printer interface 606. Further features may also be included in microscope control program 600 as desired. Note also that some of these features may be implemented in an operating system 610 (e.g., Microsoft Windows) running on computer system 200. Furthermore, access by the various software units to the hardware elements of computer system 200 (e.g., user interface system 602 access to the display 202, printer interface 606 access to printer 203) may be via the facilities of operating system 610, as is well known.

Figure 7:
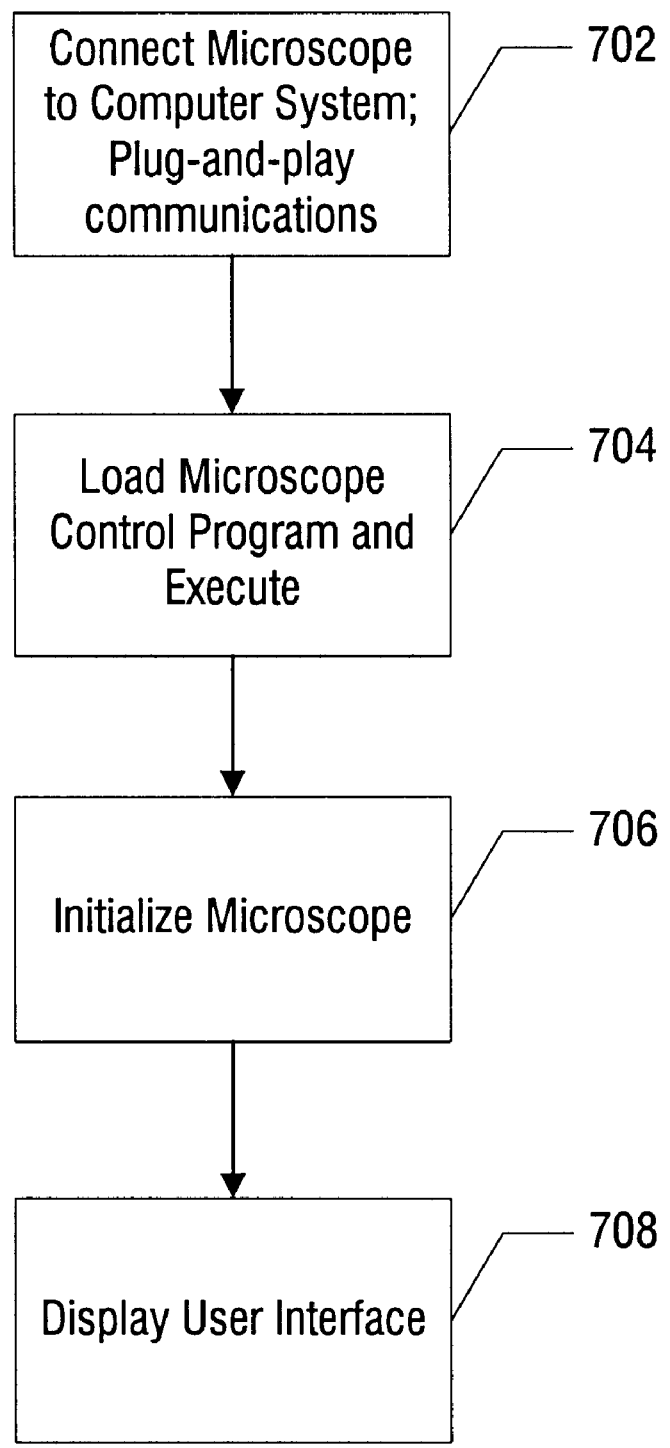
FIG. 7 shows a flow chart of a start-up procedure, according to the present invention.

In order to operate the microscope 100 in conjunction with the microscope control program 600 of computer system 200, a "start-up" procedure is first conducted. FIG. 7 shows a flow chart illustrating exemplary steps to such a start-up procedure. In step 702, the microscope 100 is connected to the computer system 200 via the cable 121, according to the appropriate connection method, as described above. Microscope 100 may be equipped to become operable with the computer system 200 (via the operating system 610) upon connection to the I/O interface 205, for example, via the well known "plugand-play" interoperability standard. The control program 600 may then be loaded and executed (step 704). Control program 600 may initialize the microscope 100 by, for example, performing test communications with the imaging unit 102 to establish that the microscope is properly connected and functional (step 706). The control system 601 then instructs user interface system 602 to provide a user interface on display 202 to allow the user to access the features and functionality of the microscope 100 (step 708). Further steps may also be included in the start up procedure.

Figure 8:
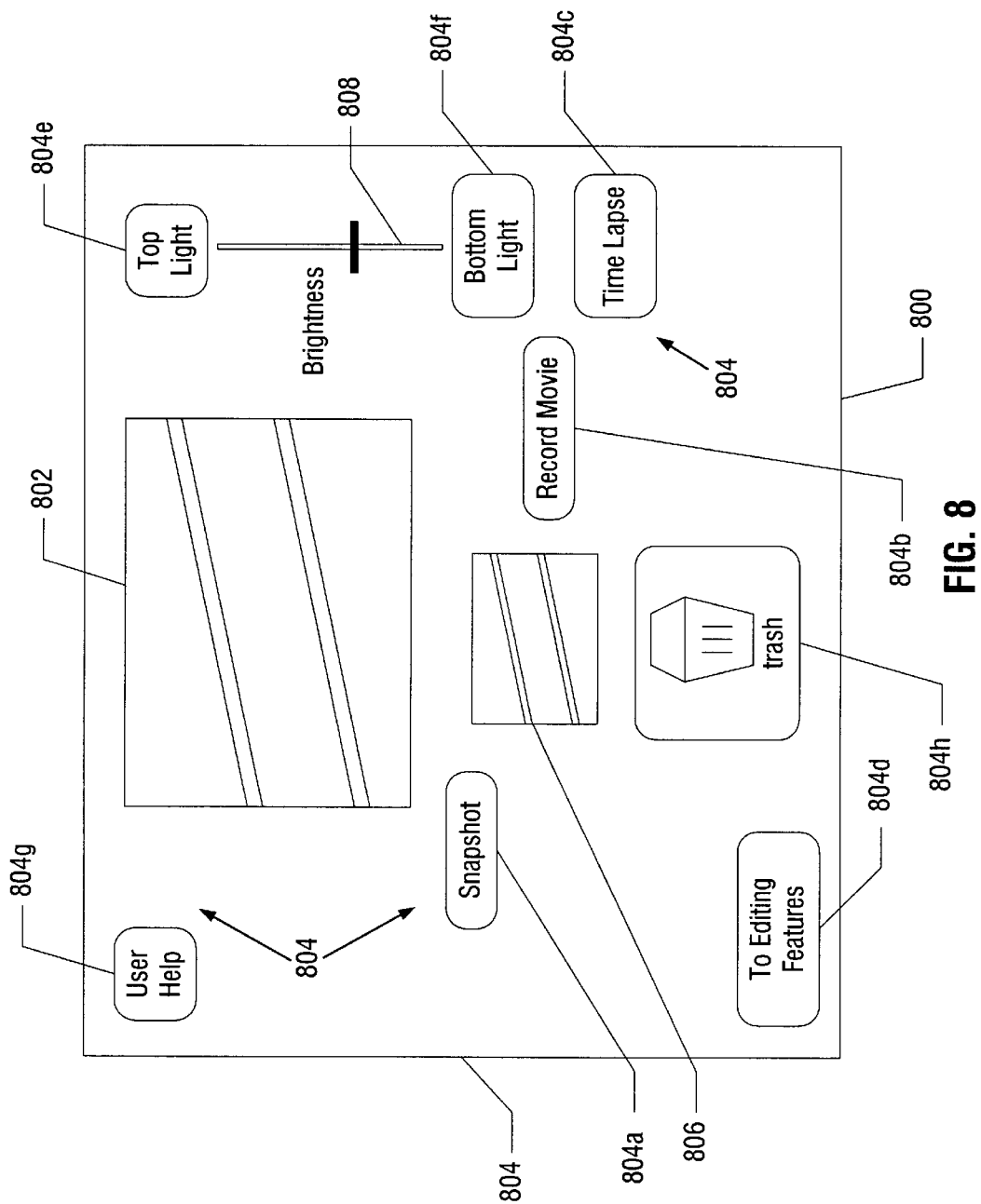
FIG. 8 shows a microscope user interface, according to the present invention.

FIG. 8 shows an exemplary microscope user interface 800 provided by user interface system 602. Microscope user interface 800 is displayed on display 202 of the computer system 200. User interface system 602 allows a user to provide input via the input devices 206 (e.g., keyboard, mouse) in order to access the features of the microscope control program 600 and the microscope 100. As shown in FIG. 8, user interface 800 includes an image window 802 for showing image data, for example, generated by the microscope 100. Image window 802 may be sized so as to accommodate the size of the images produced by the microscope 100 (or an imageprocessed variation thereof), and in this example, is 512 pixels×384 pixels. A current image window 806 is also provided in user interface 800 to view image data (a current image or clip) most recently sampled from the image data stream (described below).

A plurality of graphically depicted "buttons" 804 are arranged around the image window 802 to allow the user to select a function assigned to a respective button 804 by graphically "pressing" the button. In this example, microscope user interface 800 includes the following buttons:

"Snapshot" button 804a—accesses a "snapshot" feature—samples a single image from the stream of images produced by the imaging unit 102;

"Record Movie" button 804b—accesses a "movie clip" feature—makes multiple samples of the continuous stream of image data produced by the imaging unit 102;

"Time Lapse" button 804c—accesses a "time lapse" feature—makes multiple image samples over a specified duration for a specified sampling period;

"to Editing Features" button 804d—accesses user interface for editing features;

"Top Light" button 804e and "Bottom Light" button 804f—accesses controls for turning on/off the light source 160 of the imaging unit 102 or the light source 105 of base 101;

"User Help" button 804g—accesses a viewer for instructional information (e.g., a help file); and "Trash" button 804h—deletes the sample(s) stored for current image window 806.

Each button may be identified by a picture icon and/or text phrase representing its function, for example, the "Trash" button 804h may be represented by a trash can. Such identification may be desirable particularly for use with children.

Figure 9:
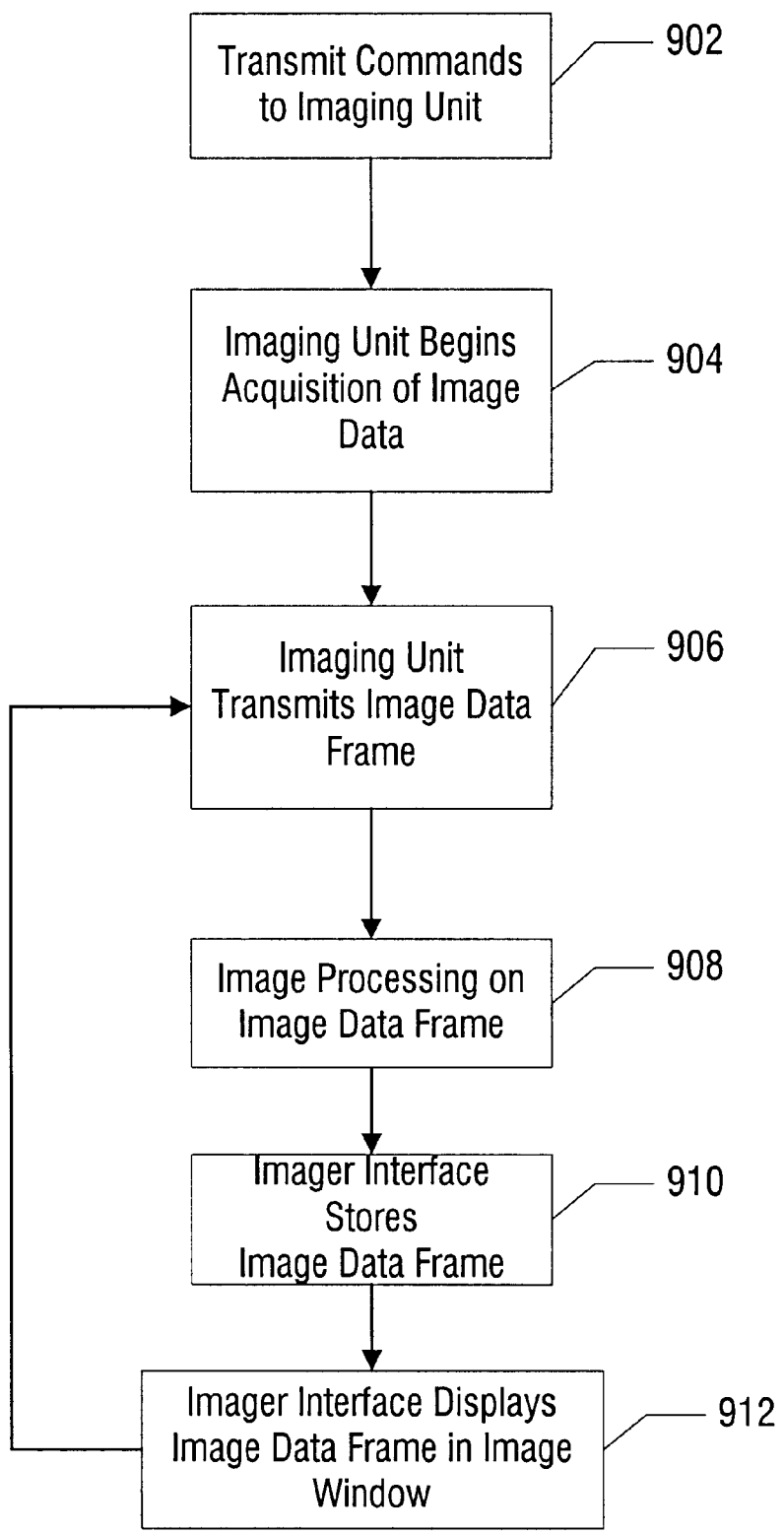
FIG. 9 shows a flow chart of an exemplary image acquisition process for the electronic microscope according to the present inventions.

Upon execution of user interface 800, the microscope control program 600 may instruct the imaging unit 102 (via the imager interface 603) to begin providing image data to computer system 200. FIG. 9 shows a flow chart of an exemplary process performed for image acquisition from imaging unit 102. In step 902, imager interface 603 provides the necessary commands to the imaging unit 102 to initiate image acquisition. According to these commands, imaging unit 102 (and specifically imager circuit 140) begins acquisition of magnified images of objects disposed in front of the imaging unit 102 (via the imaging process described previously) at a specified rate (step 904), for example, four images per second. Each magnified image is transmitted as an image data "frame" to the imager interface 603, for example, via cable 121 and I/O interface 205 (step 906). Imager interface 603 may then perform various image processing functions on the image data frame in order to format the image data for display in user interface 800, for example, bilinear pixel interpolation (step 908), although no image processing may be needed. The image data frame is then stored in storage system 204 (step 910), and displayed in image window 802 of user interface 800 (step 912). As new image data frames are received from the imaging unit 102, imager interface will replace the previously stored and displayed image data frame with the new image data frames. Because the individual images are generated at a relatively fast rate, the user may be able to see approximately continuous "real-time" video in the image window 802 (although this video actually may be "choppy" and slightly delayed).

Included in user interface 800 are buttons 804e and 804f to control the light sources 160, 105, and a graphical slide 808, which may be used to specify the brightness level of the image data produced by the imaging unit 102. The user interface unit 602 may alter the buttons 804e and 804f to indicate the state of the light sources 160, 105 (i.e., on or off) by shading the buttons 804e, 804f. The graphical slide 808 may be used to alter the brightness conditioning performed on the image data by the imager circuit 140. The microscope user interface 800 may be set as the first user interface displayed when the microscope control program 600 is executed.

Figure 10:
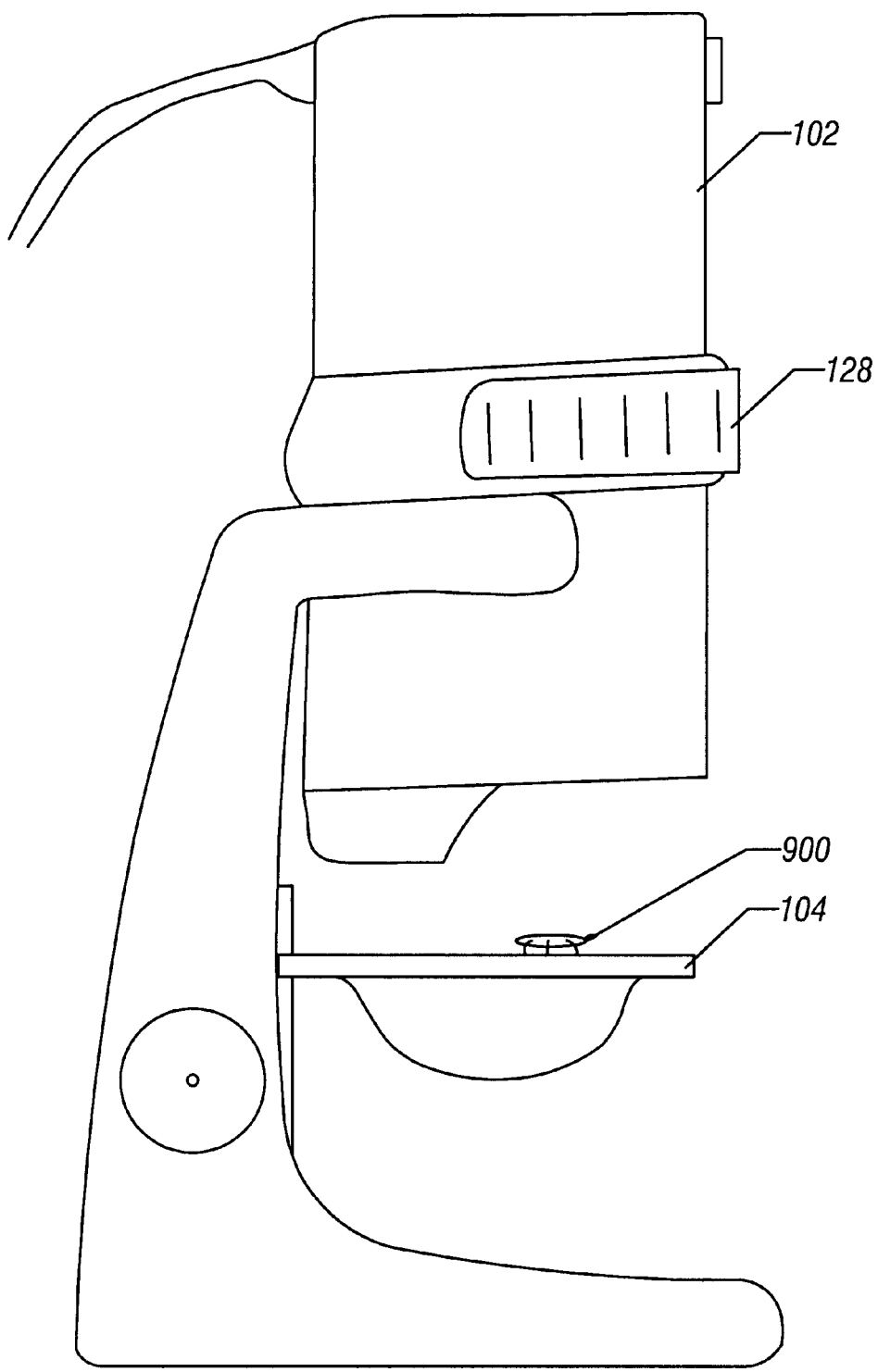
FIG. 10 shows a side view of the electronic microscope of FIG. 2 in conjunction with a first example of the operation of the electronic microscope, according to the present invention.
Figure 11:
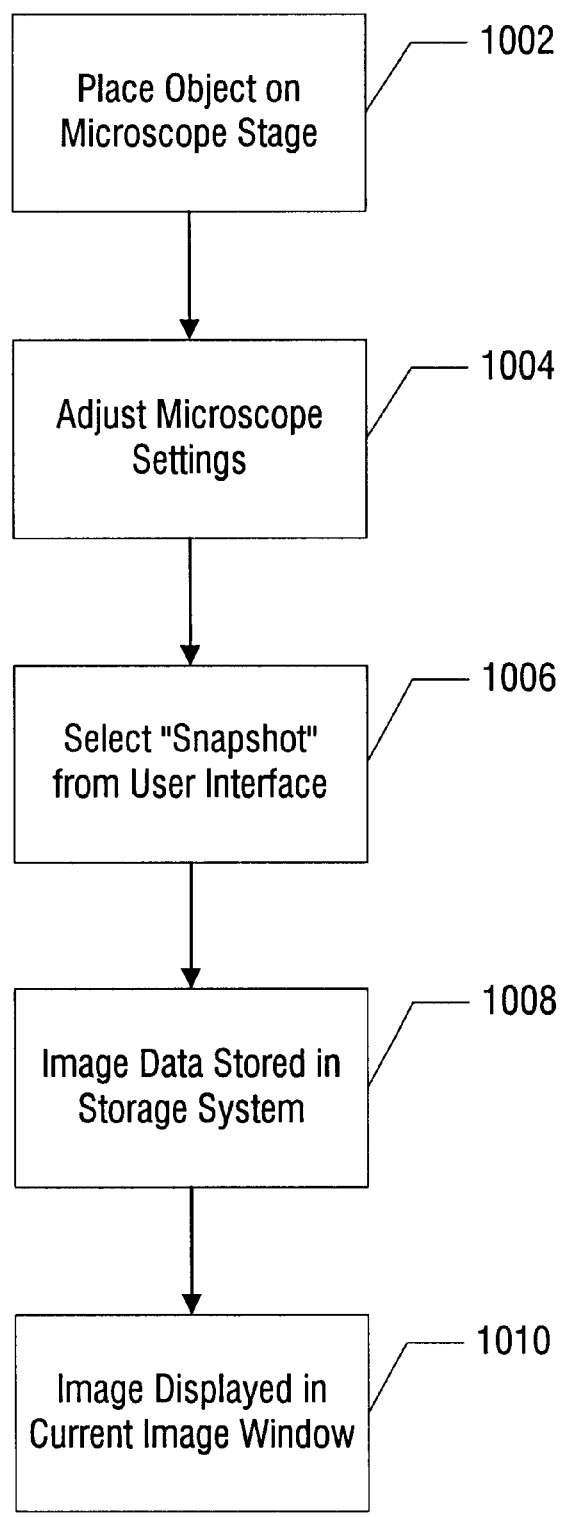
FIG. 11 shows a flow chart of the first example of the operation of the electronic microscope, according to the present invention.

A first example of the operation of exemplary microscope control program 600 in conjunction with the exemplary microscope 100 will now be illustrated by reference to FIGS. 10 and 11. This first example of operation will illustrate a process to obtain a single image from the microscope 100. Referring now to FIG. 11, which shows a flow chart of this first exemplary operation, in step 1002, the user places an object 900 for which a microscopic image is desired in front of imaging unit 102, for example, by placing the object 900 on stage 104. FIG. 10 shows an arrangement of microscope 100 to image the object 900 (as shown, a bug). The user may then adjust the settings of the microscope 100 (step 1004), for example, by rotating the optical unit 122 of imaging unit 102 (via grip 128) to select the optical path 130 having the desired magnification level, by adjusting the height of stage 104, or turning on/off the light sources 105, 160. Imaging unit 102 will be generating a stream of image data frames that are received at computer system 200 and displayed in the image window 802. The user may then save an image of the object 900, for example, by selecting the button 804a (the "snapshot" button) in user interface 800 (step 1006). Upon selecting the button 804a, the central control 601 invokes a snapshot facility in imager interface 603, which saves a single frame from the stream of image data frames being produced by imaging unit 102 (step 1008). User interface system 602 displays the current image in current image window 806 (step 1010).

Once the magnified image has been acquired, the user may view the image via the current image window 806 to see if the image is clear, focused, directed at the right portion of the object 900, and so forth. If unacceptable, the user may re-adjust the microscope 100 and resample the magnified image (steps 1004–1010). If the image is acceptable, the user can then access the further features of the microscope control program 600 to perform various activities using the sampled image (e.g., saving the image, editing the image, etc.), as will be described below.

Figure 12:
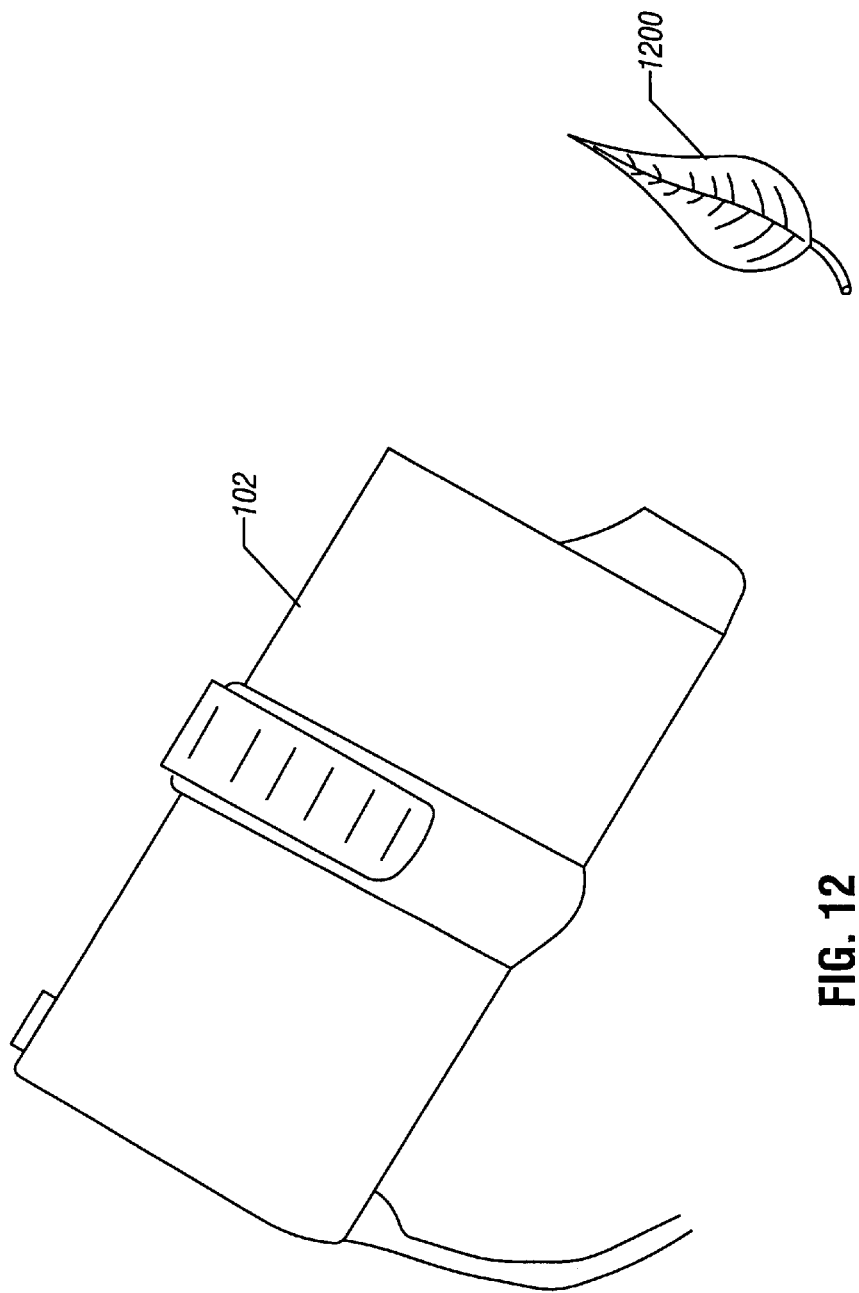
FIG. 12 shows a side view of the electronic microscope of FIG. 2 in conjunction with a second example of the operation of the electronic microscope, according to the present invention.

A second example of the operation of the microscope 100 in conjunction with the control program 600 is illustrated by FIG. 12. This second example illustrates use of the imaging unit 102 independently from the base 101, e.g., as a "handheld" device. The user may place the imaging unit 102 behind an object 1200 for which a microscopic image is desired (as shown in FIG. 12, a leaf on the ground). As with the first operation example described above (see FIG. 11), the user may adjust the settings of the microscope 100, for example, by rotating the optical unit 122 of imaging unit 102 to select the optical path 130 having the desired magnification level, by adjusting the brightness level, or by turning on/off the light source 160. Because the imaging unit 102 is not connected to base 101, electrical contacts 165 of imaging unit 102 are not mated with the base 101. The control program 600 recognizes the disconnection from base 101 (for example, due to a message sent from the removal detection circuitry of imaging unit 102), and may disable the "bottom light" button 804f in user interface 800. The user may then acquire an image from the continuous stream of magnified images being produced by imaging unit 102, for example, by pressing the switch button 163 of imaging unit 102, which in this example has the same effect as pressing the "snapshot" button 804a in user interface 800. Use of the switch button 163 may be more convenient where the imaging unit 102 is being used at a distance from the computer system 200.

Figure 13:
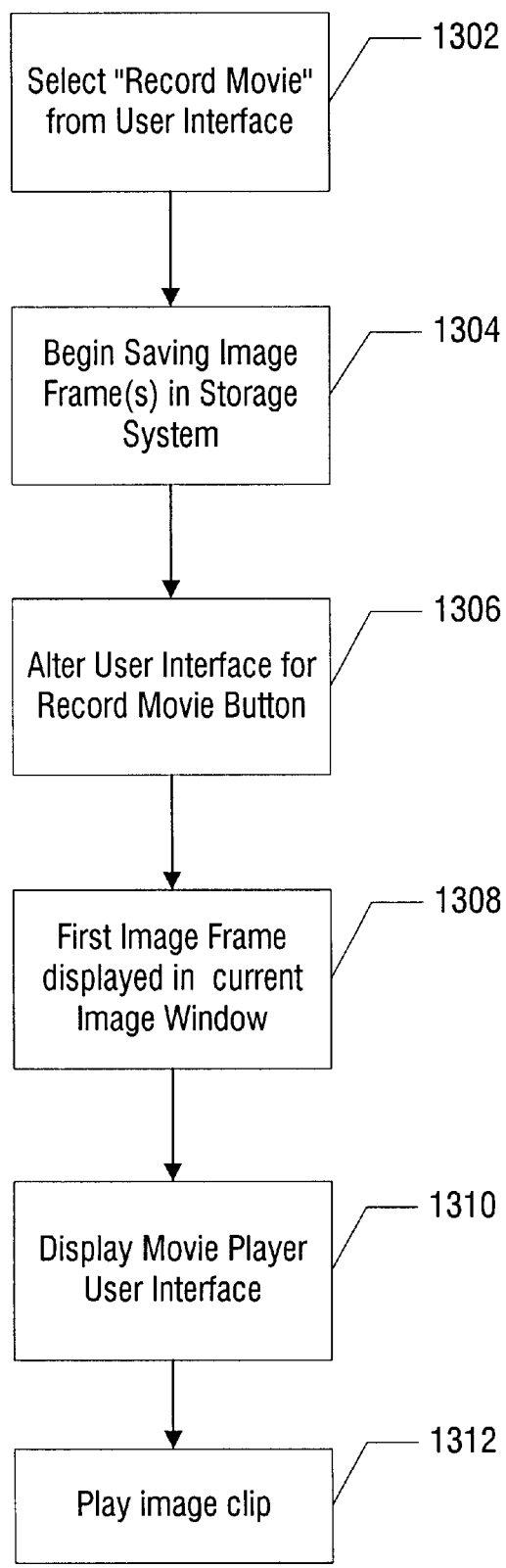
FIG. 13 shows a flow chart of the operation of a movie clip feature, according to the present invention.
Figure 14:
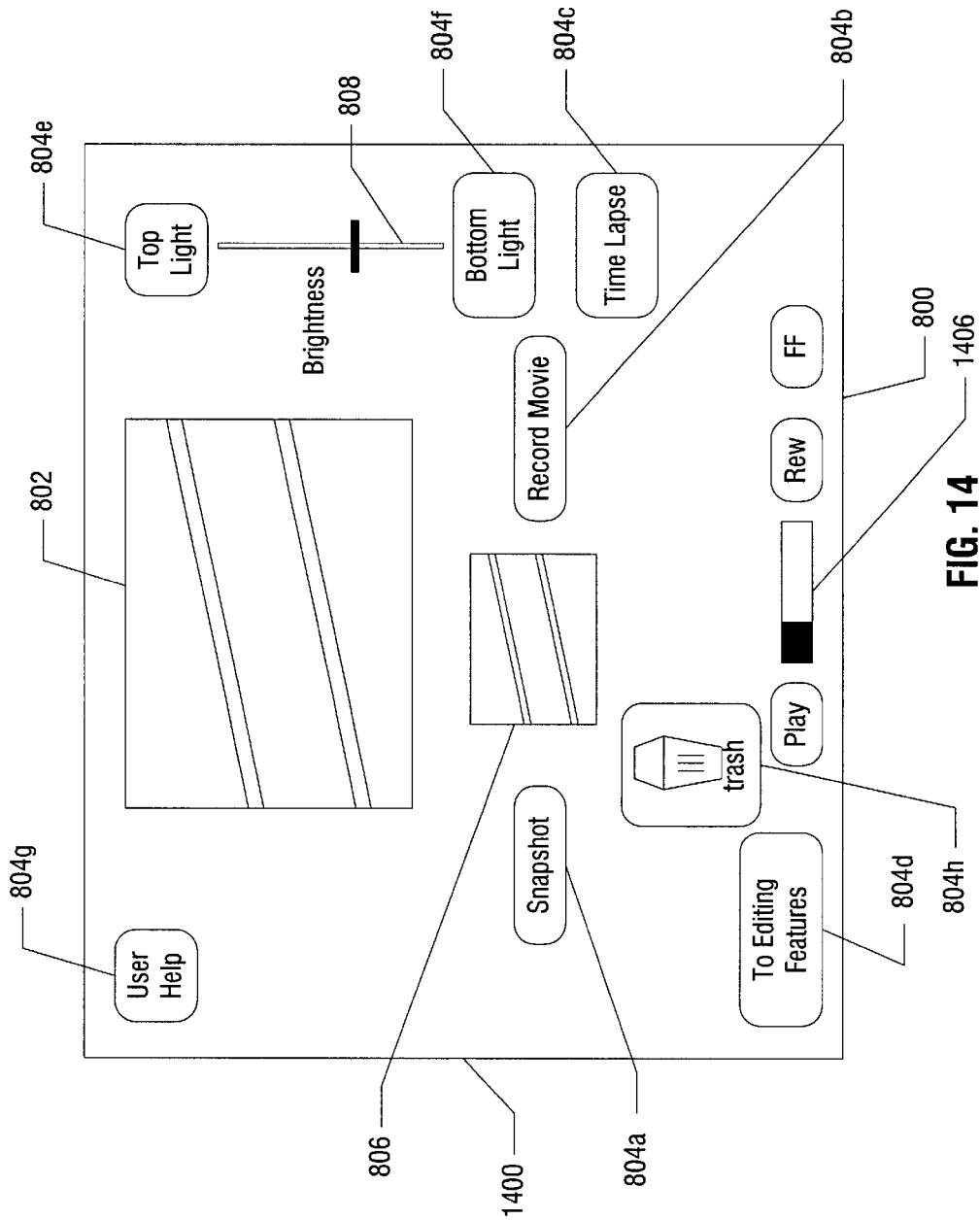
FIG. 14 shows movie player user interface, according to the present invention.

Microscope control-program 600 also provides a feature that allows the creation of multi-image "clips" of image data, ("movie clips"). Referring to user interface 800 (FIG. 8), the user may select the "record movie" button 804b to access the movie clip feature. (Alternatively, the user may press and hold the switch button 163 for an extended period of time to indicate that the record movie feature is desired.) The operation of the movie clip feature is reflected by the flow chart of FIG. 13. Upon selecting the button 804b (step 1302), the imager interface 603 begins sampling of image frames being transmitted by the imaging unit 102 by storage of these frames in the storage system 204 (step 1304). The central control 601 instructs the user interface system 602 to alter the user interface 800 to show that pressing the "record movie" button 804b again will stop the sampling of image frames (step 1306). When the user presses the button 804b to stop image sampling (or after a certain timeout period occurs), the first frame of the sample image frames is displayed in the current image window 806 (step 1308). In step 1310, a movie player user interface 1400 is displayed (for example, as shown in FIG. 14), which provides buttons 1404 to manipulate the movie clip: to play the clip (button 1404a), to rewind the clip (button 1404b), and to fast forward the clip (button 1404c). A position bar 1406 may also be displayed to show the present position in the clip. The user may the play the clip (step 1312) by selecting the play button 1404a, causing the image frames of the movie clip to be displayed sequentially in current image window 806.

Figure 15:
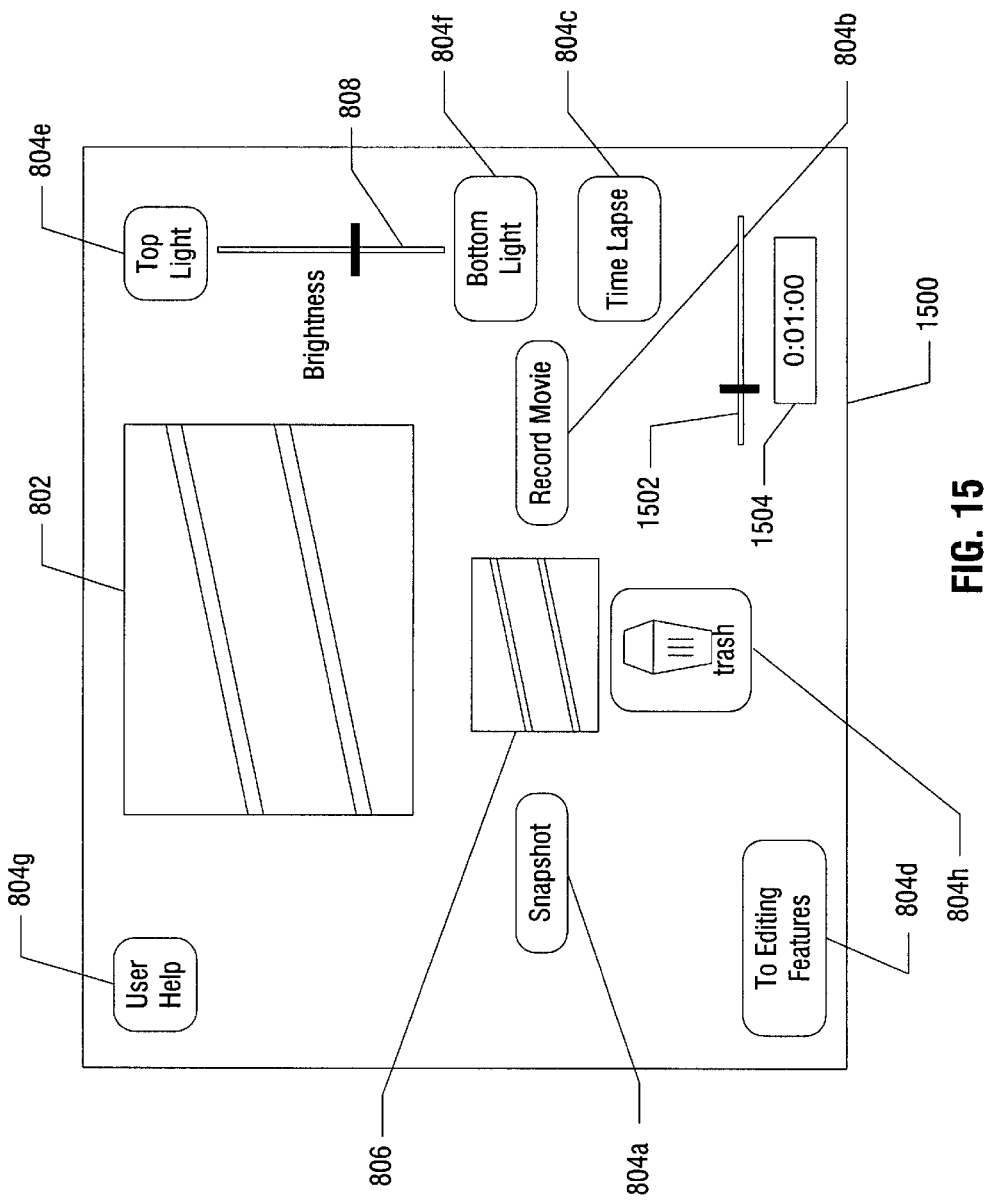
FIG. 15 shows a time lapse interface, according to the present invention.

Microscope control program 600 also provides a feature that allows the creation of "time lapse" imaging of objects using the microscope 100. The user may access the time lapse creation feature by selecting the button 804c from user interface 800. Upon selection of button 804c, a time lapse user interface 1500 (for example as depicted in FIG. 15) may be displayed. As shown in FIG. 15, a slide bar 1502 is provided to adjust the duration of the time lapse period. A display 1504 of the time associated with the slide bar setting is also provided. A further slide bar and display may also be provided to set the interval between each sample. After entry of these parameters, the time lapse creation feature performs sampling of the image data stream from the imaging unit 102 according to the timing parameters. The sampling process will be similar to that used to perform movie clip recording (see FIG. 13), except that the sampling is performed according to the timing specified through the time lapse user interface 1500.

Figure 16:
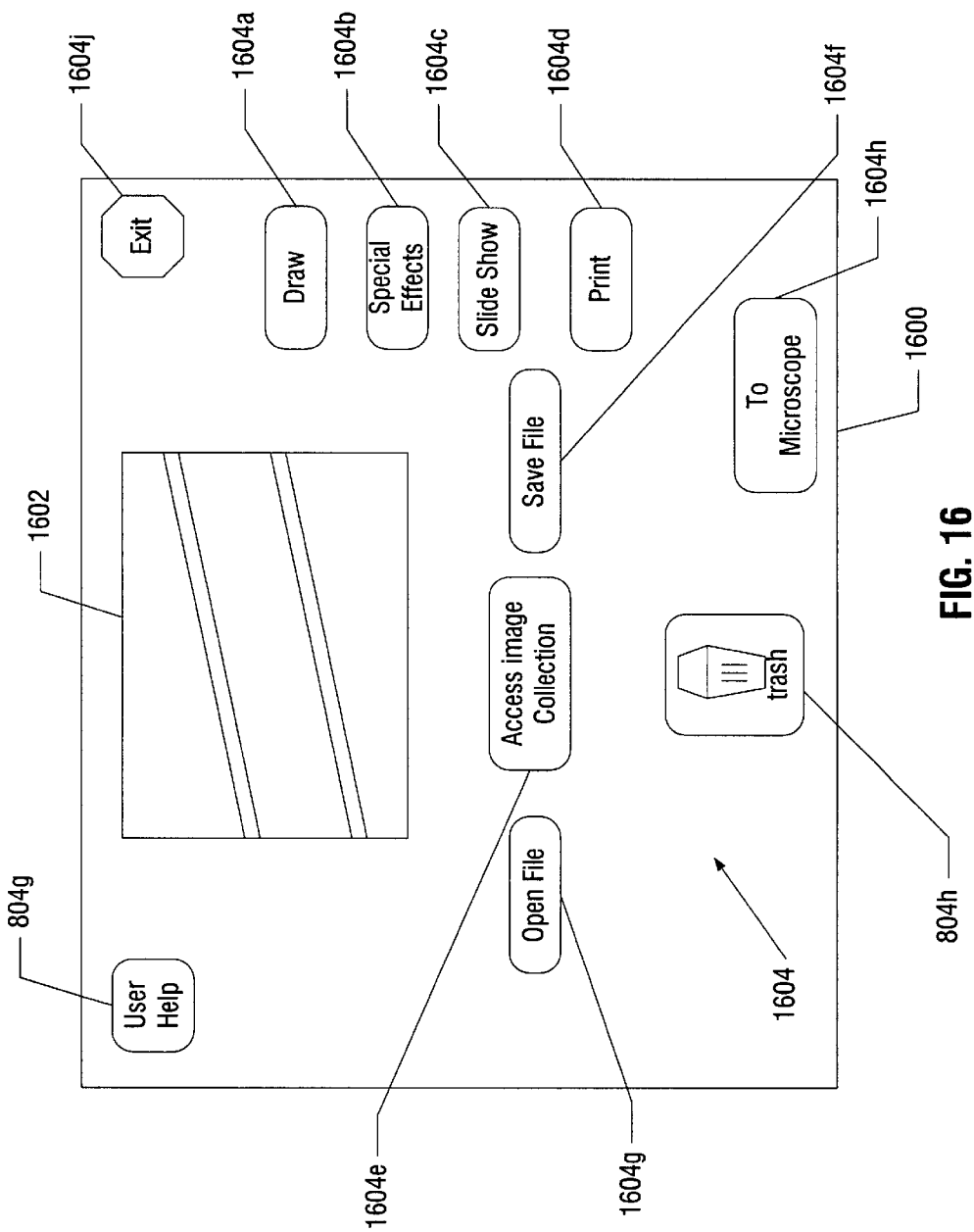
FIG. 16 shows an editing user interface, according to the present invention.

Exemplary microscope control program 600 provides additional features to further manipulate the images received from the microscope 100. These features are accessed, for example, by selecting the "to Editing Features" button 804d from microscope user interface 800. Selecting the button 804d causes the control program 600 to display editing user interface 1600, illustrated in FIG. 16. As shown, editing user interface 1600 provides an image window 1602, which may be used to display the current image frame(or, in the case of a clip, the first frame of the stored clip). Also provided in editing user interface 1600 are buttons 1604 that allow access to various editing, presentation and file storage facilities provided by the microscope control program 600:

"Draw" button 1604a—provides access to an image editing program to edit the current image;

"Special Effects" button 1604b—provides access to an image editing program to apply effects to the current image;

"Slide Show" button 1604c—provides access to a slide show creation program;

"Print" button 1604d—provides access to a printing program to print out the current image(s);

"Access Image Collection" button 1604e—provides access to a facility for storage and retrieval of image frames without using file names;

"Save File" button 1604f—provides access to a file save facility to save the current image frame as a file (uses file names);

"Open File" button 1604g—provides access to a file retrieve facility to retrieve an image frame file and store as the current image (displayed in image window 1602);

"to Microscope" button 1604h—provides access to the microscope user interface 800; and "Exit" button 1604i—exits the microscope control program 600.

Each of the facilities and interfaces described above are integrated into the microscope control program 600 (for example, as part of image processing library 604), thus allowing easy manipulation of the image data sampled from the microscope 100 by otherwise unskilled computer users (e.g., children).

Figure 17:
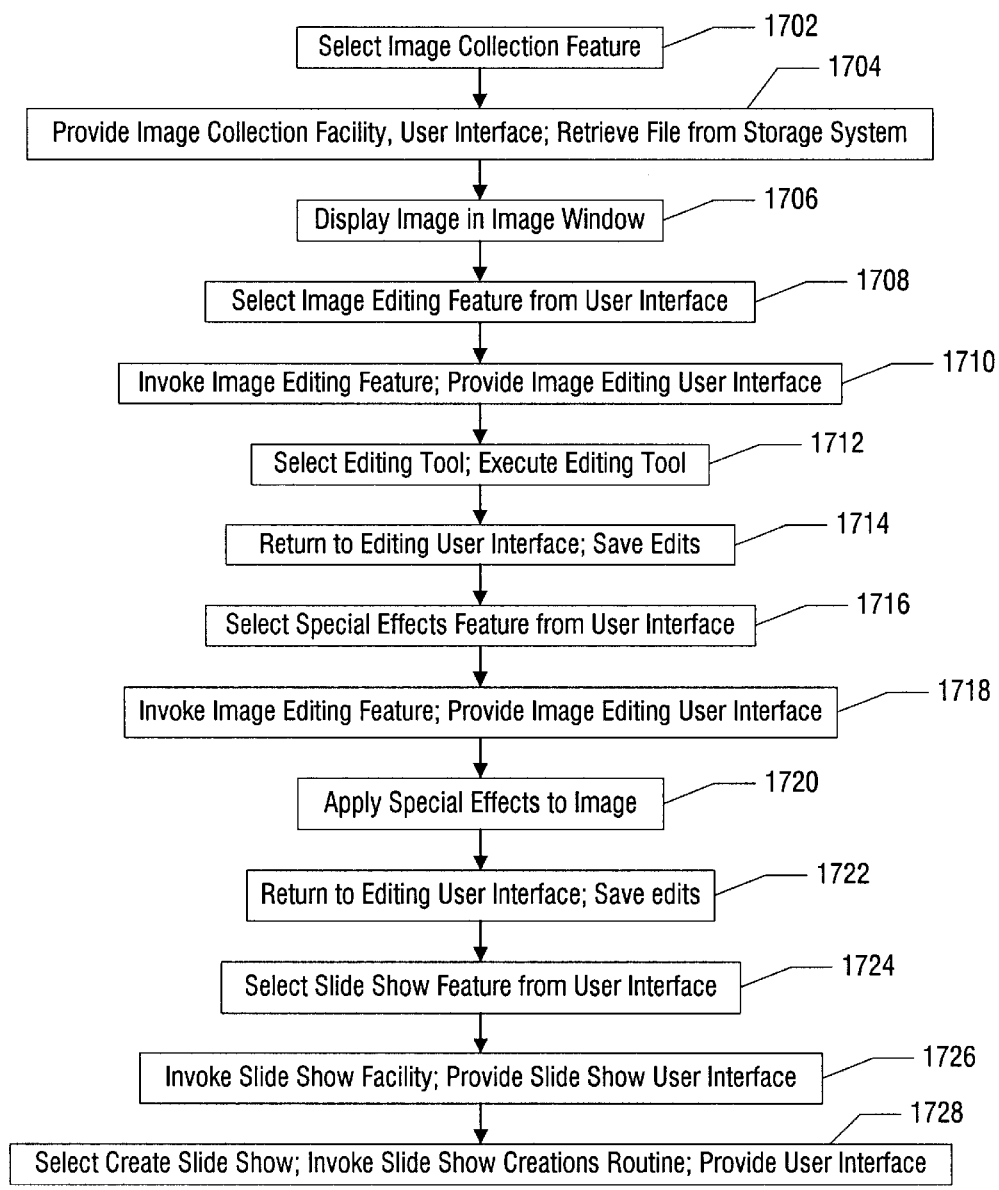
FIG. 17 shows a flow chart of a third example of the operation of the electronic microscope, according to the present invention.
Figure 18:
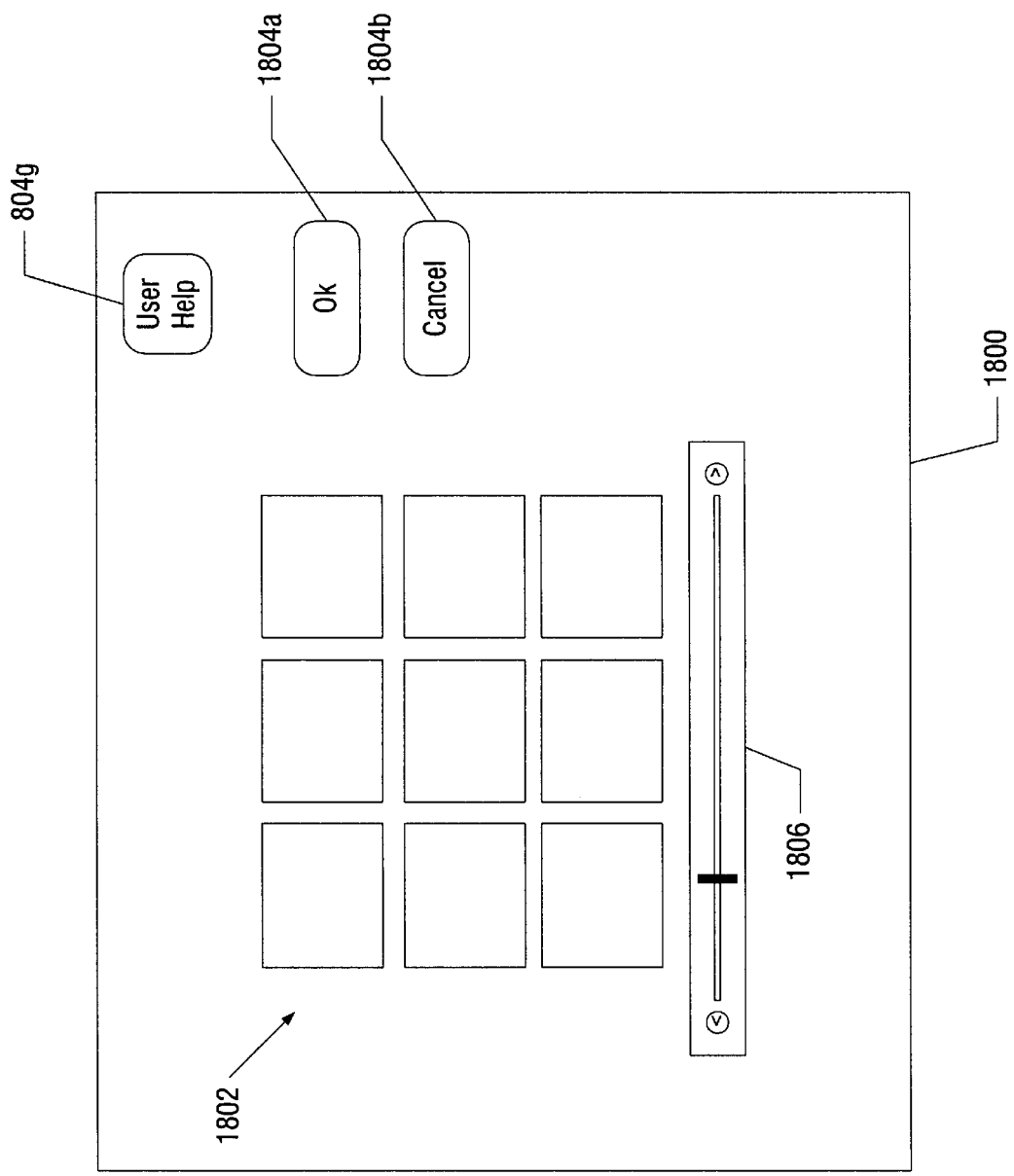
FIG. 18 shows an image collection user interface, according to the present invention.

A third example of the operation of the microscope 100 and the control program 600 of computer system 200 will now be described with reference to FIGS. 16–22. In this third example, a user retrieves image data previously saved in the storage system 204 of computer system 200, and uses the image processing library 604 of control program 600 to edit the image data and create a multimedia slide show. FIG. 17 shows a flow chart of this third operational example. In step 1702, the user selects the button 1604e from editing user interface 1600 (the "access image collection" button, see FIG. 16), which causes the control program 600 to provide an image collection facility to allow the user to select a file stored in storage system 204 (step 1704). FIG. 18 is an exemplary image collection user interface 1800 for the image collection facility, which is displayed by user interface unit 602. Image collection facility stores each image (or movie clip) in an image collection without the need for file names, by using a graphical representation of the image data. For example, miniature images 1802 of each image frame (or the first frame of a clip) may be displayed in the image collection user interface 1800, thus allowing the user to select a desired image from the image collection simply and quickly. A scroll bar 1806 is provided to scroll through the miniature images 1802, and buttons 1804a and 1804b are provided to indicate whether the selection is "OK" or should be "Canceled," respectively.

Selection of a miniature image from the image collection facility causes the image data associated with that miniature image 1802 to be set as the current image frame (for example, via retrieval by the file system interface 605 of the image from the storage system 204), and the image frame is displayed in the image window 1602 of editing user interface 1600 (step 1706).

Figure 19:
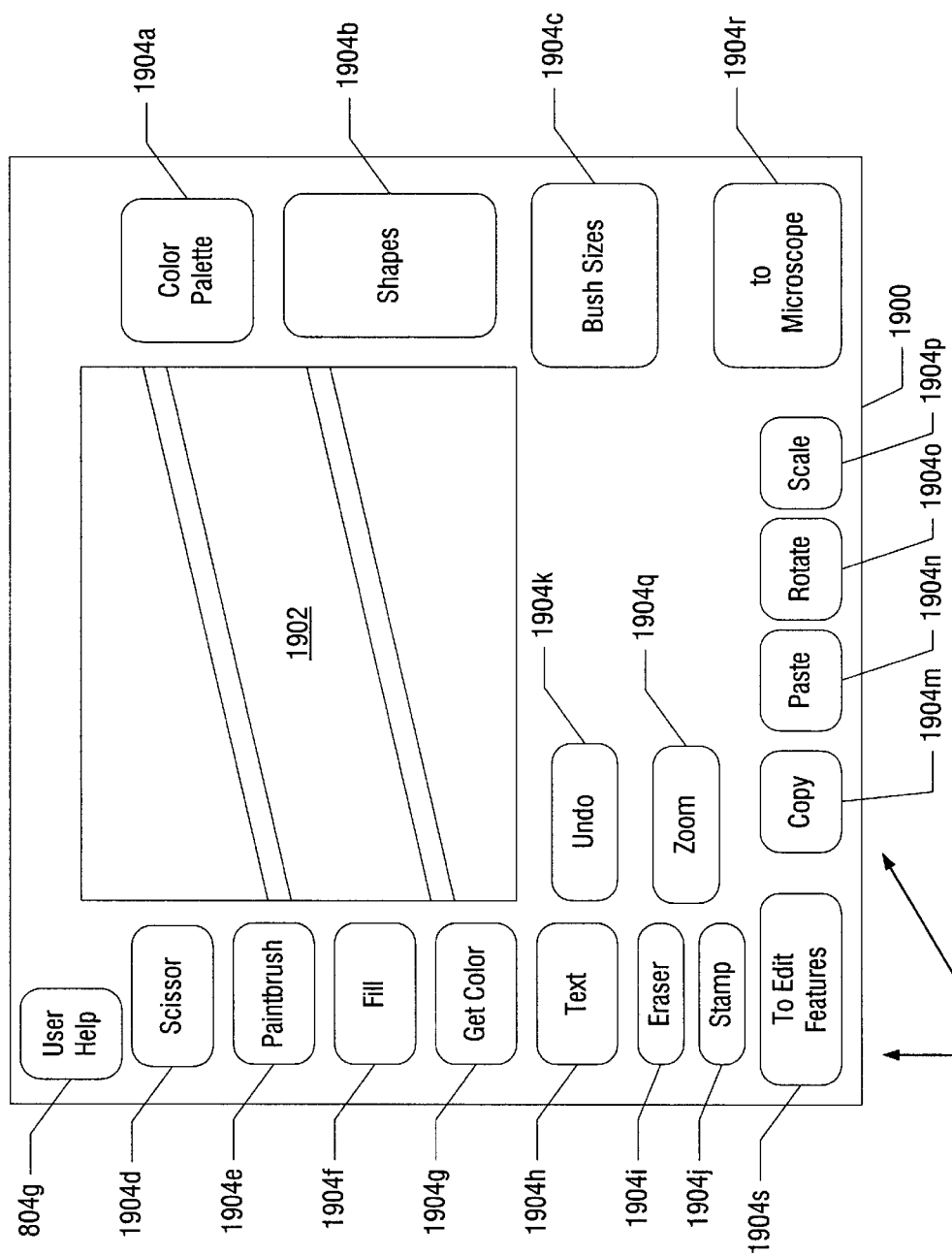
FIG. 19 shows an image editing user interface, according to the present invention.

In step 1708, the user selects the button 1604a (the "draw" button), which causes the control program 600 to execute the image editing facility of image processing library 604. User interface system 602 provides an image editing user interface 1900 on the display 202 (step 1710). An exemplary image editing user interface 1900 is depicted in FIG. 19. An editing window 1902 is provided similar to the image window 1602 from editing user interface 1600, in which the image from the current image frame is displayed. Around editing window 1902 are a number of graphically displayed buttons 1904 to allow the user to select an editing feature provided by the image editing facility. As indicated by the buttons 1904, image editing facility provides several well-known editing features: a color palette (1904a), a number of shapes to apply to the image (1904b), a number of brush sizes to use during editing (1904c), scissors (1904d), a paintbrush (1904e), a color filler (1904f), a color match to get color (1904g), a text inserter (1904h), an eraser (1904i), a stamp to apply selected shapes to the image (1904j), an image flipper (1904l), selected copy (1904m), paste (1904n), selected rotate (1904o), image scaling (1904p), and zoom (1904q). Other well-known features could also be implemented. An undo feature (button 1904k) allows previous edits to be reversed. As with the user interfaces 800 and 1600, a picture icon or text may be used to form or label each button 1904, in order to indicate the function assigned to the button 1904.

In step 1712, the user performs editing on the image using one or more of the tools represented by the buttons 1904 provided in image editing user interface 1904. After the user has completed any desired editing, the user may exit the image editing facility by selecting either a "to Edit Features" button 1904s (which returns the user to the editing user interface 1600) or by selecting the "to Microscope" button 1904r (which send the user to the microscope user interface 800 for further use of microscope 100). In either case, the edited image frame is stored in the image collection. In this example, the user opts to return to the editing user interface 1600 (step 1714).

Figure 20:
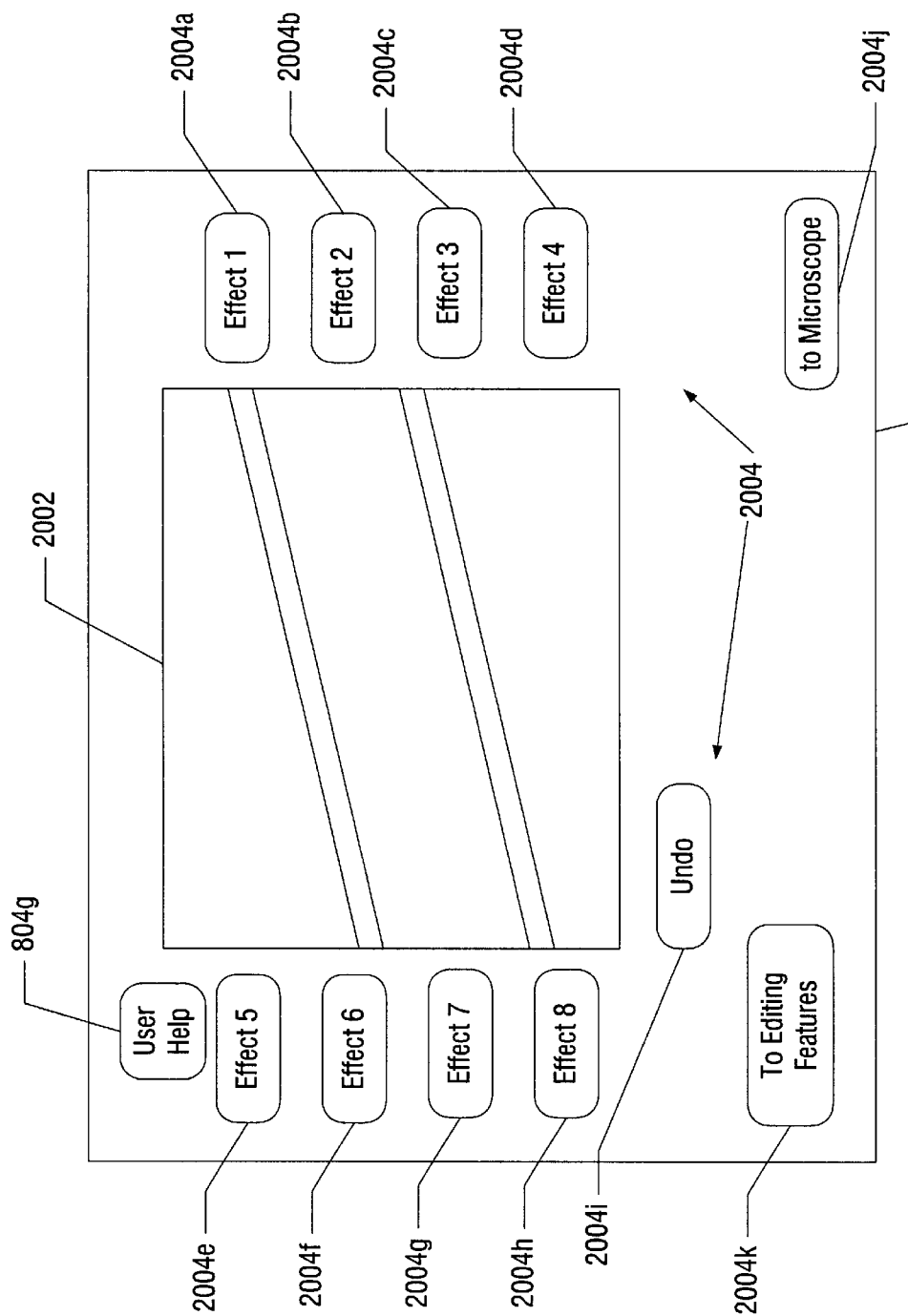
FIG. 20 shows a special effects user interface, according to the present invention.

From the editing user interface, the user may then perform further editing of the image by selecting button 1604b (step 1716), which invokes a special effects editing facility of the image processing library 604 (step 1718). FIG. 20 shows an example of a special effects user interface 2000 corresponding to the features provided by the special effects editing facility. An editing window 2002 is provided to display the current image and any edits made to the image (similar to the editing window 1902 of the image editing facility). Buttons 2004a–h provide a number of effects that may be applied to the image frame (e.g., morphing, swirling, cubing). The type of effect may be indicated by a graphical indication in the button 2004. An "undo" button 2004i is provided to reverse applied effects. Once any special effects have been applied (step 1720), the user may again exit by returning to the editing user interface 1600 via the "to Editing Features" button 2004k or by going to the microscope user interface 800 via the "to Microscope" button 2004l. In this case, the user opts to return to the editing user interface 1600 (step 1722).

Figure 21:
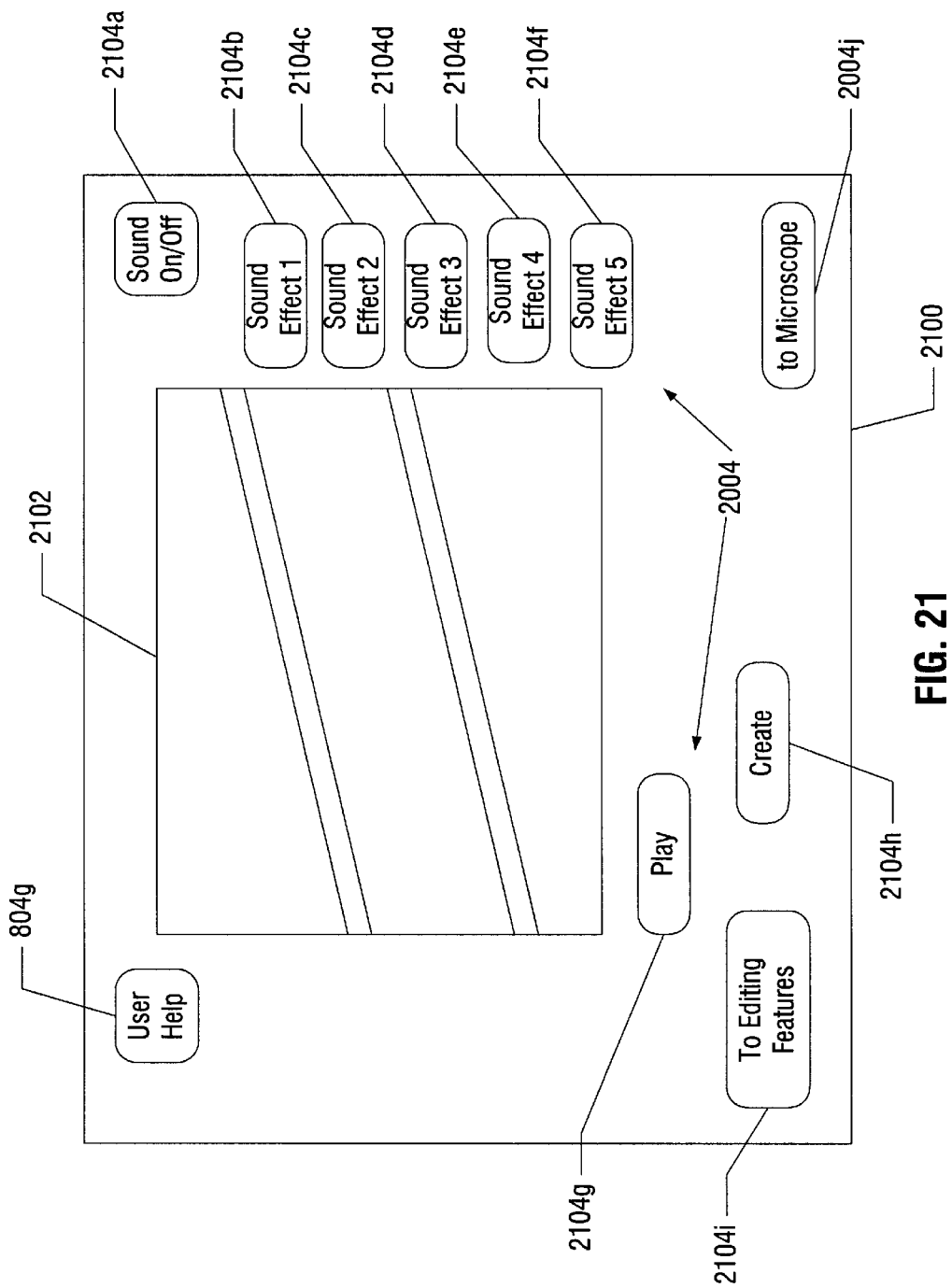
FIG. 21 shows a first slide show user interface, according to the present invention.

From the editing user interface, the user may then create a multimedia slide show using images stored in the image collection, by selecting the "Slide Show" button 1604c (step 1724) to cause the control program 600 to invoke a slide show facility (step 1726). FIG. 21 shows an example of a first slide show user interface 2100. An image window 2102 is provided to show slide show images. Button 2104a allows the user to enable the use of sound effects with the slide show. Buttons 2104b–f allows the user to add different sound effects to the image being displayed in the image window 2102. Button 2104g allows the user to play the slide show. Button 2104h allows the user to create a series of images to use as the slide show. Pressing button 2104h (step 1728) causes the control program 600 to execute a slide show creation routine and provide second slide show user interface 2200, shown in FIG. 22.

Figure 22:
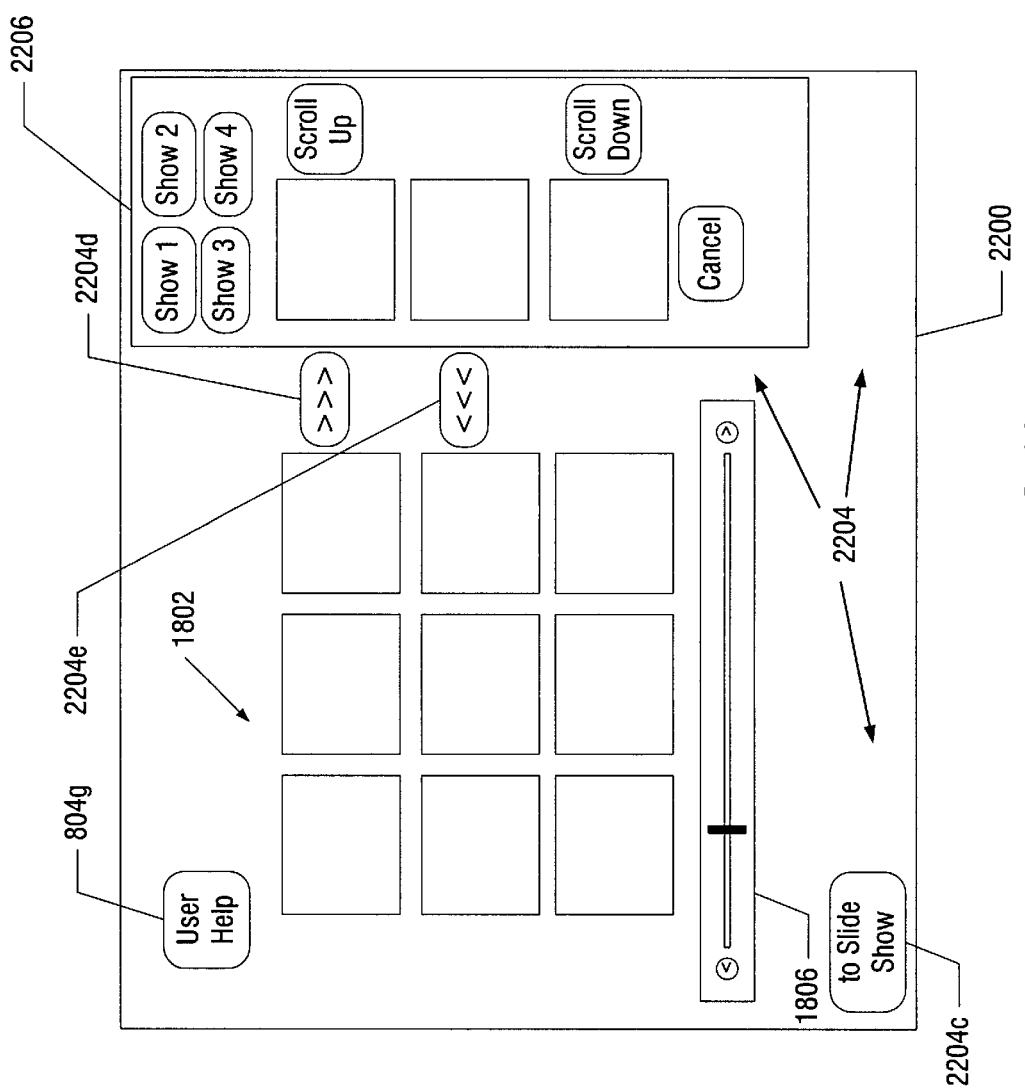
FIG. 22 shows a second slide show user interface, according to the present invention.

As shown in FIG. 22, the slide show creation routine uses the image collection display 1802 and scroll bar 1806 used in the image collection user interface 1800 to allow the user to access the image collection. In addition, buttons 2204d and 2204e are provided to add and remove image frames for one of a number of slide shows as displayed in area 2206 (in this example, four slide shows are supported). After the images are added and arranged in the slide show displayed in area 2206 (step 1730), the user may select the "to Slide Show" button 2204c to return to the slide show facility. The user may then play the slide show (step 1732) by pressing the "play" button 2104g.

Figure 23:
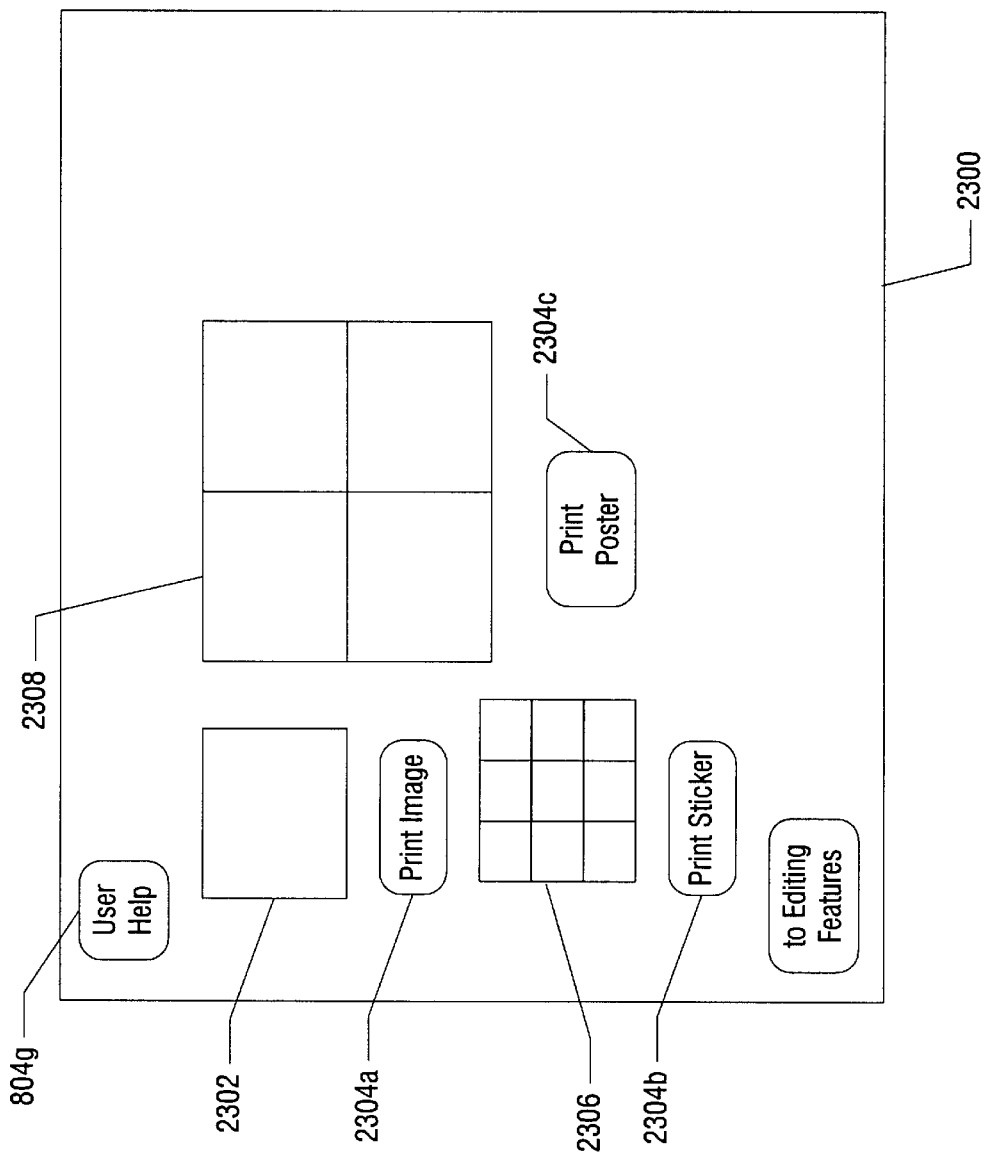
FIG. 23 shows a printing user interface, according to the present invention.

The user also is provided a printing facility (via printer interface 606) to print the current image to printer 203. The user may select button 1604d from editing user interface 1600 to invoke the printing facility. FIG. 23 is an example of a printing user interface 2300. As shown by the printing user interface 2300, the user is provided with three printing options via the printing facility: printing the current image frame as a single image on a single sheet of paper ("print image" button 2304a), printing the current image frame as multiple images on a single sheet of paper ("print stickers" button 2304b), or printing the current image frame a single image on multiple sheets of paper ("print poster" button 2304c). A preview window 2302 shows the expected result of printing the current image frame on a single sheet of paper. A preview window 2306 shows the expected result of printing multiple copies of the current image frame on a single sheet of paper (for example, as a 3×3 array). A preview window 2308 shows the expected result of printing the current image frame on multiple sheets of paper (for example, on a 2×2 array of paper).

The microscope 100 and microscope control program 600 examples described above according to the present invention thus allow for easy user acquisition and manipulation of magnified images of objects. Microscope 100 provides a durable and easy to use piece of equipment for magnified imaging, and microscope control program 600 (via computer system 200) provides an easy to use integrated operational environment for users to manipulate the microscope 100 and view, edit and store magnified images.

Additional features may be incorporated into the exemplary microscope 100. One such feature is a motorized motion system to drive the stage 104 of base 101. This motorized motion system may include a z-axis motor, x-axis motor, and/or y-axis motor. In addition to allowing stage position control via the user interface, where a z-axis motor is provided, the microscope may provide an autofocus operation and a "total depth of field" feature (obtaining multiple images focused for different field depths). Where x- or y-axis motors are used, the microscope may provide "stitching" operation to create a large image from a number of smaller images. Each of these features is described below.

Figure 24:
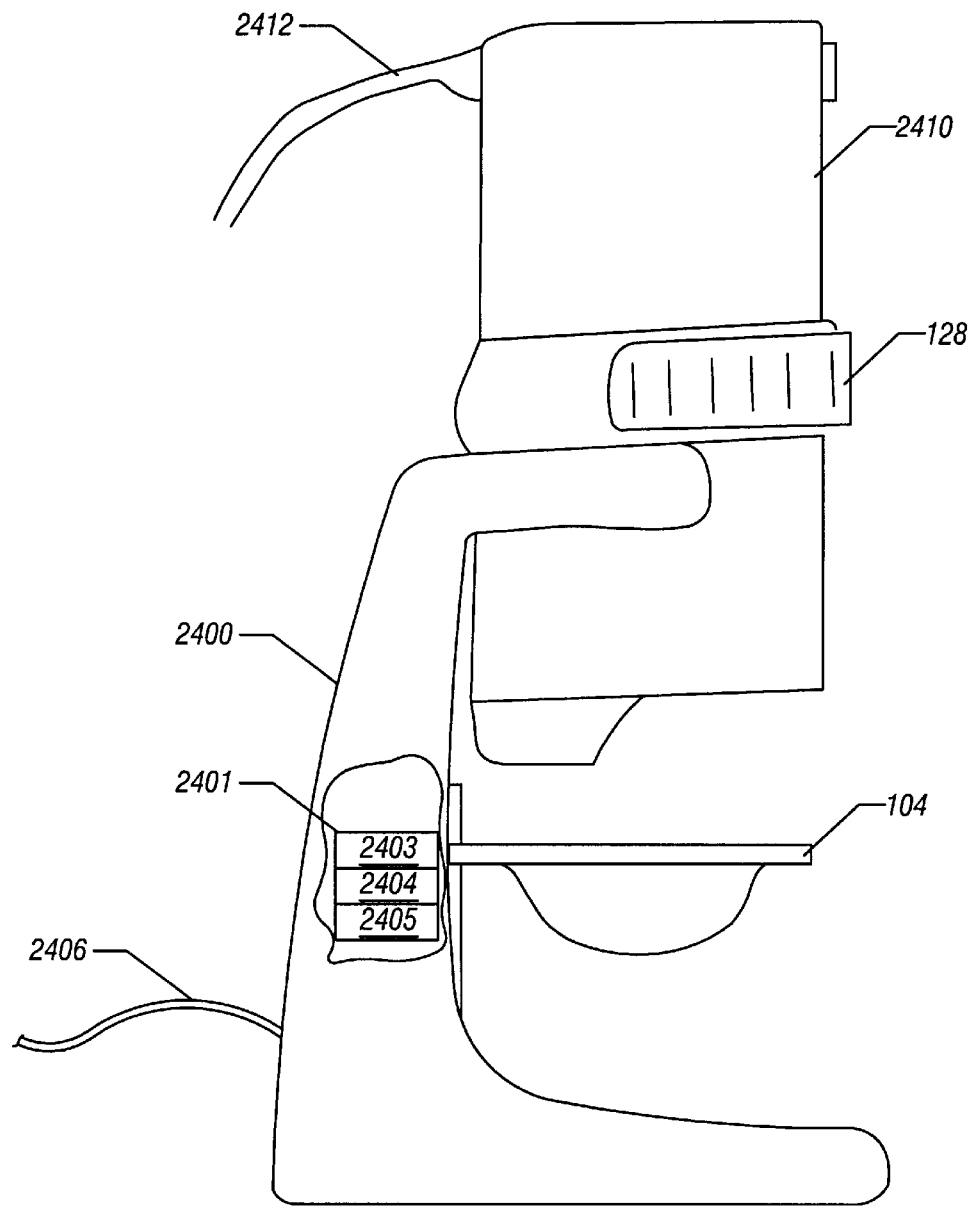
FIG. 24 shows a side view of a base having a motorized motion system, according to the present invention.
Figure 25:
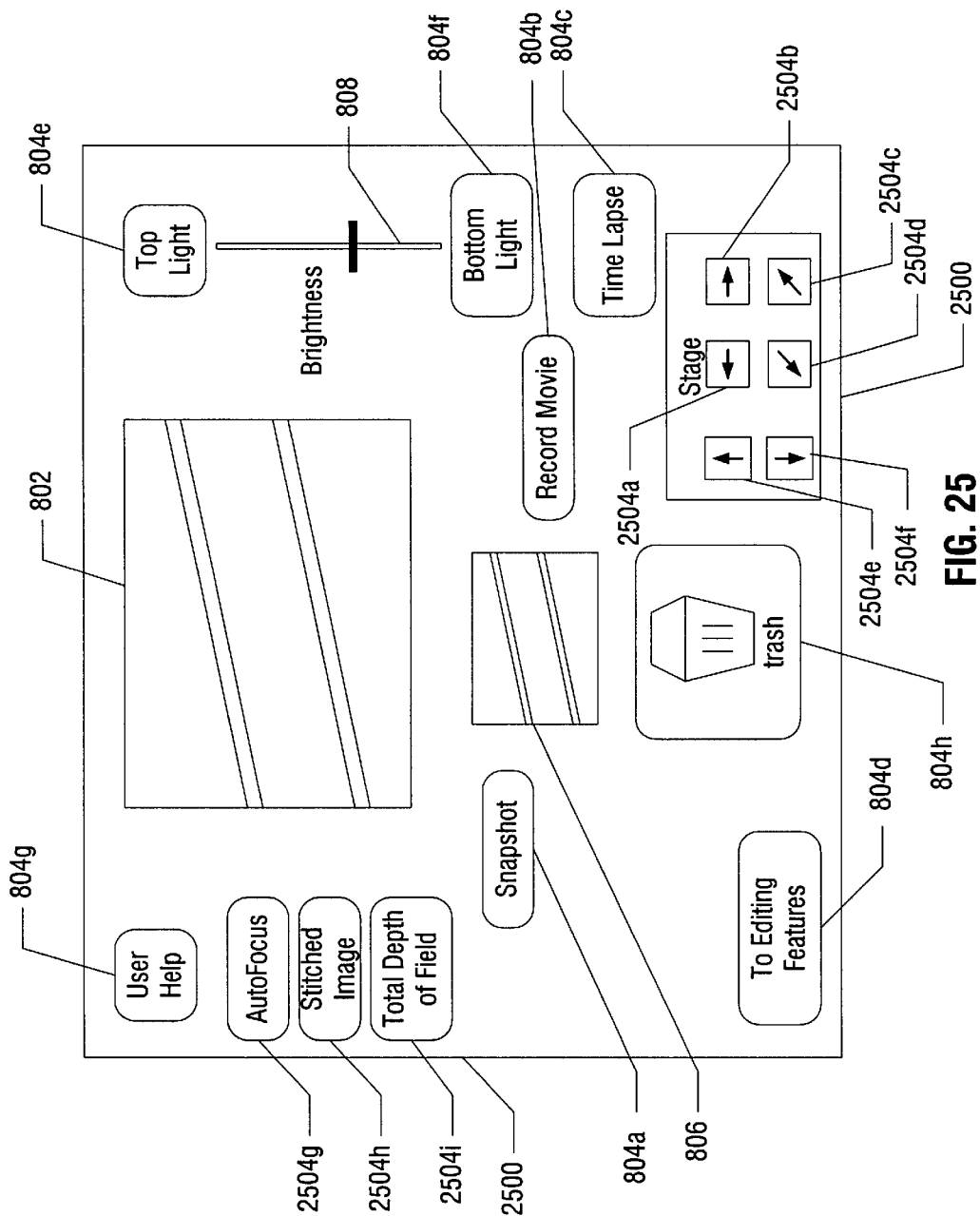
FIG. 25 shows a motorized user interface, according to the present invention.
Figure 26:
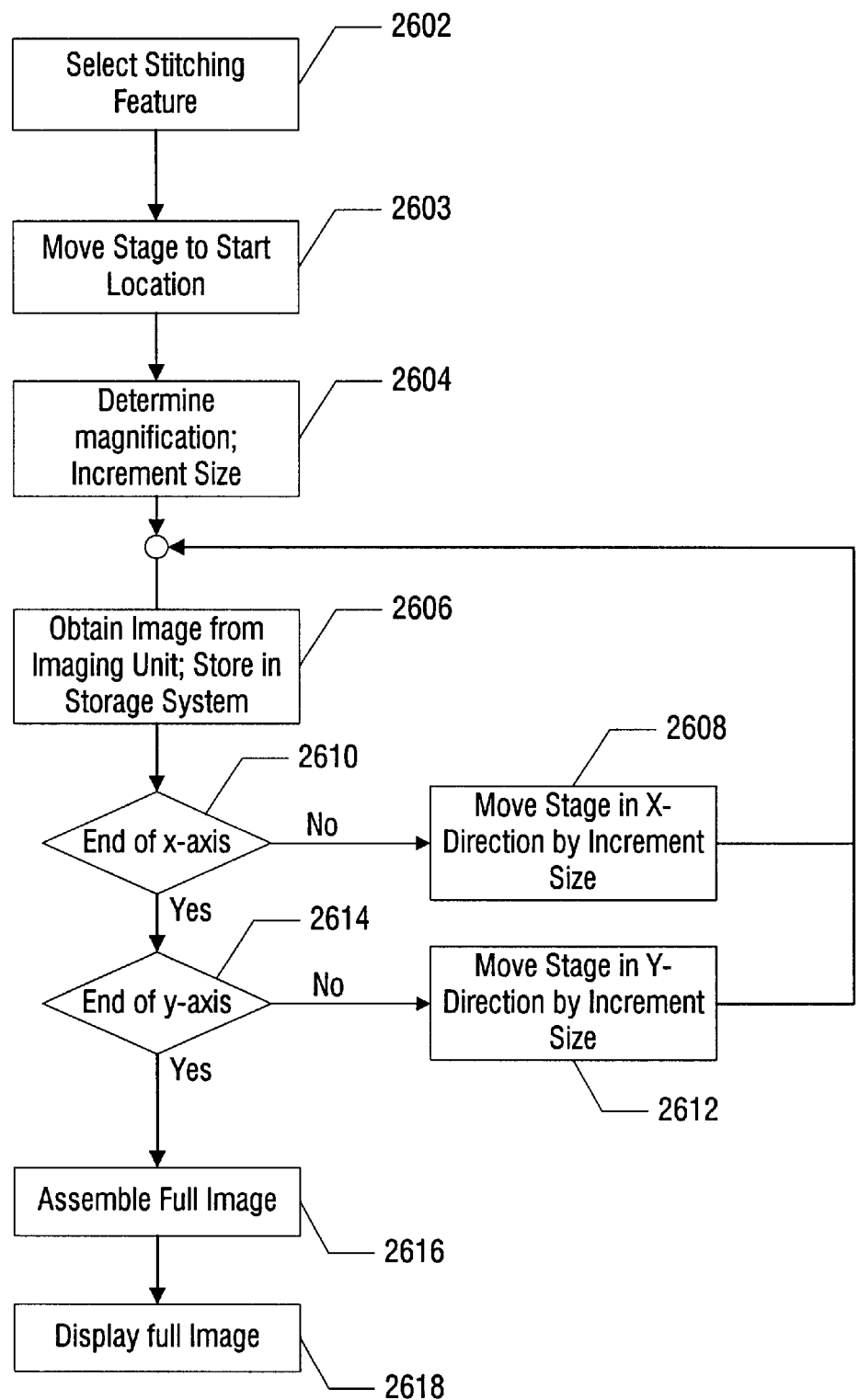
FIG. 26 shows a flow chart of an example of the operation of a stitching operation, according to the present invention.

An example of a motorized motion system and its attendant features is illustrated in FIGS. 24–26. FIG. 24 illustrates a base 2400, similar to base 101, but including a motorized motion system 2401. The motorized motion system. 2401 includes a z-axis motor 2403, an x-axis motor 2404, and a y-axis motor 2405 (illustrated through a cutaway interior view in FIG. 24), each of which is mounted in the base 2400. Motors 2403, 2404 and 2405 may be implemented as stepper motors, allowing controlled, incremental movements, as is well known. Motors 2403–2405 include circuitry to allow for motor control, and may be electrically connected to the I/O interface 205 of the computer system 200 to allow for control of the motors. This connection may be made in various ways, for example, a cable 2406 may be directly connected from the base 2400 to the computer system 200. Alternatively, the connection made be made through cable 2412 of imaging unit 2410 (which is similar to imaging unit 102, with additional features as well as become apparent below). Electrical contacts in the base 2400 and corresponding contacts in the imaging unit 2410 (similar to those used in imaging unit 102 to control light 105 in base 101) may be used to achieve this connection. Motors 2403–2405 may physically interface with stage 104 in any well known manner to effect the movement of the stage 104 in the x, y or z directions (e.g., via tongue-and-groove gearing).

FIG. 25 illustrates a motorized user interface 2500, which provides access to the additional features available via the use of motorized movement system 2401. User interface 2500 is similar to microscope user interface 800, with the addition of buttons 2504a–2504i: buttons 2504a–f provide access to a facility for direct user control of the stage position in the x, y and z directions; button 2504g provides access to the autofocus feature; button 2504h provides access to the stitched image feature; and button 2504i provides access to the total depth of field feature. Note that motorized user interface 2500 will vary depending on the actual implementation of motor system 2401—if only a z-axis motor 2403 is used, there is no need for buttons 2504a–2504d, or for the stitched image button 2504h, and these buttons may be omitted.

The software for performing control of the motorized motion system may be implemented independently or as part of one of the existing subunits of control program 600. In this example, the control of the motorized motion system 2401 is performed as part of the imager interface 603, which provides signals to the motorized motion system 2401 via the I/O interface 205. The autofocus feature may be implemented using well known autofocus algorithms, which may also be implemented independently or as part of the imager interface 603. Selection of the autofocus button 2504g thus causes autofocusing of the image via movement of the stage in the z-direction.

The stitching feature and the total depth of focus feature may be implemented, for example, as part of the image processing library 604. The stitching feature is illustrated by the flow chart of FIG. 26. In step 2602, the user selects the stitching feature by selecting the "stitched image" button 2504h from user interface 2500. According to the stitching feature, the stage 104 is then positioned at a starting location in the x- and y-axes (step 2603). In step 2604, the magnification level being provided by the imaging unit 2410 is determined in order to determine the distance to move the stage for each image (the "increment size"). This determination may be made from user input (i.e., the user enters the magnification level), or automatically (as is described below).

In step 2606, an image is acquired and stored in the storage system 204. A check is made to see if the stage 104 has been moved across the entire x-axis range of motion (step 2610). If not, the stage 104 is then moved in the x-direction by one increment size (step 2608), and another image is obtained (step 2606). Once the stage 104 has reached the end of its x-axis motion, a check is made to see if the stage 104 has reached the end of its y-axis range of motion (step 2614). If not, the stage 104 is then moved in the y-direction by one increment size (step 2612), and images are again acquired over the x-axis range of motion (steps 2606–2610). Once the entire stage area has been imaged, a "full" image (likely larger than the individual acquired images) may now be stitched together according to known stitching algorithms (step 2616). Once the full image has been stitched, the full image may be displayed (step 2618), for example, in image window 802. Addition scrolling and zooming features may be provided for better viewing.

Figure 27:
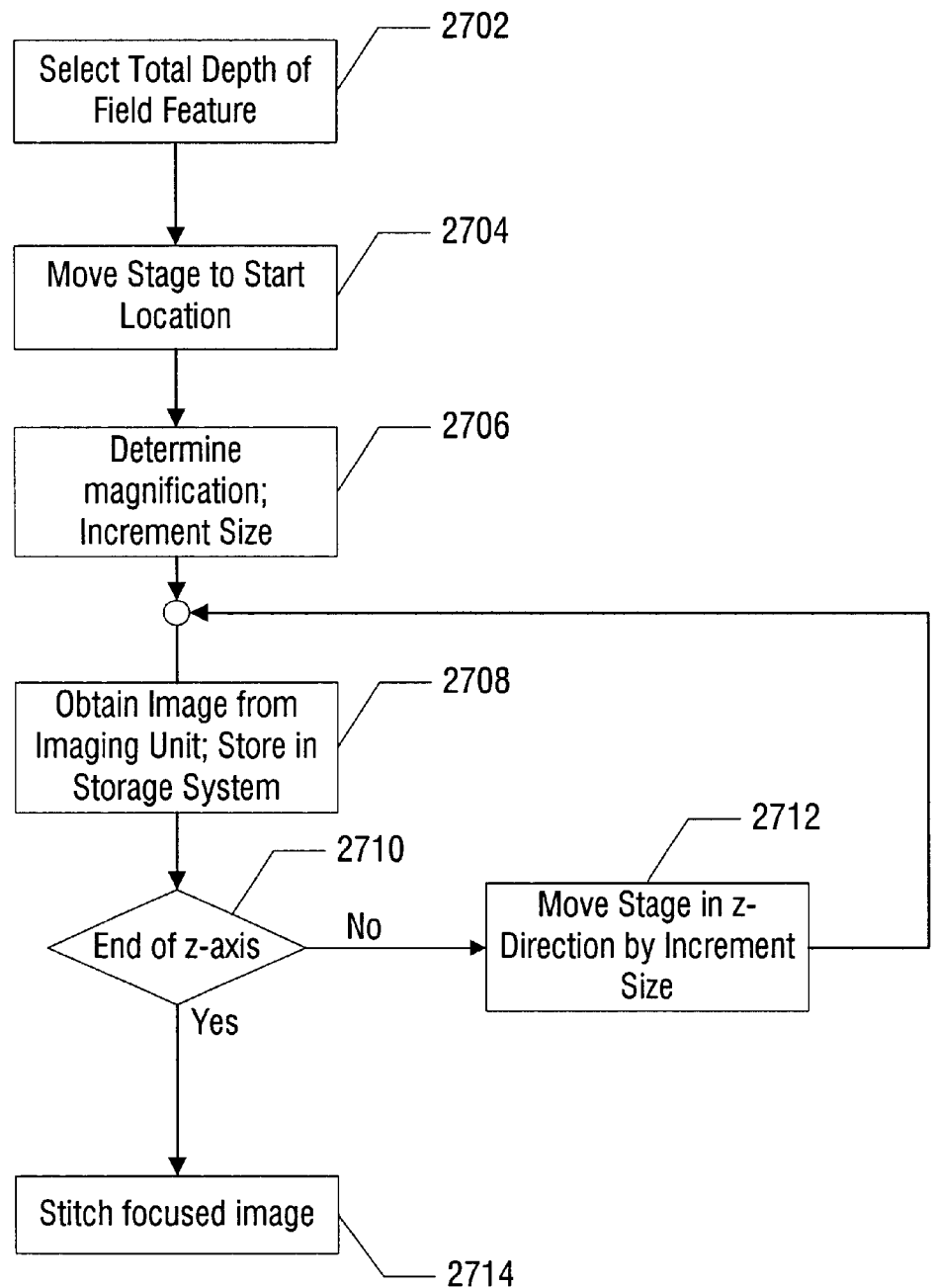
FIG. 27 shows a flow chart of an example of the operation of a total depth of field operation, according to the present invention.

The total depth of focus (field) feature is illustrated in the flow chart of FIG. 27. In step 2702, the user selects the "total depth of field" button 2504i from user interface 2500. According to the total depth of field feature, the stage 104 is positioned at a starting z-axis position (step 2704). The magnification level being provided by the imaging unit 2410 is determined either manually or automatically (as described below) to set the increment to use for moving the stage 104 in the z-direction (step 2706). An image is then obtained from the imaging unit 2410 and stored in the storage system 204 (step 2708). If the stage 104 has not been moved over the entire z-axis range (step 2710), the stage is moved one increment in the z-direction (step 2712) and another image is acquired (step 2708). If the stage 104 has moved over the entire z-axis range, all the images have been acquired, and may then be stitched together to present, for example, a single in-focus image (step 2714).

As an alternative, to achieve stage motion for the stitching feature and total depth of focus feature, the motorized motion system may be replaced by a (well-known) spring-loaded motion system, such that the user may provide the "power" needed to move the stage through "winding" of a spring mechanism.

Another additional feature that may be included is an automatic magnification detection operation, which allows the control program 600 to determine the magnification level being provided by the imaging unit 2410. In one embodiment of this feature, the magnification level of each of the available optical paths 130 is "hard wired" into the imager unit 2410, such that the imager circuit 140 may detect the identity of the optical path 130 that is positioned in front of the imaging surface 143, with knowledge of the magnification level provided by that particular optical path, and thereafter provide this information to the computer system 200 when requested.

Figure 28:
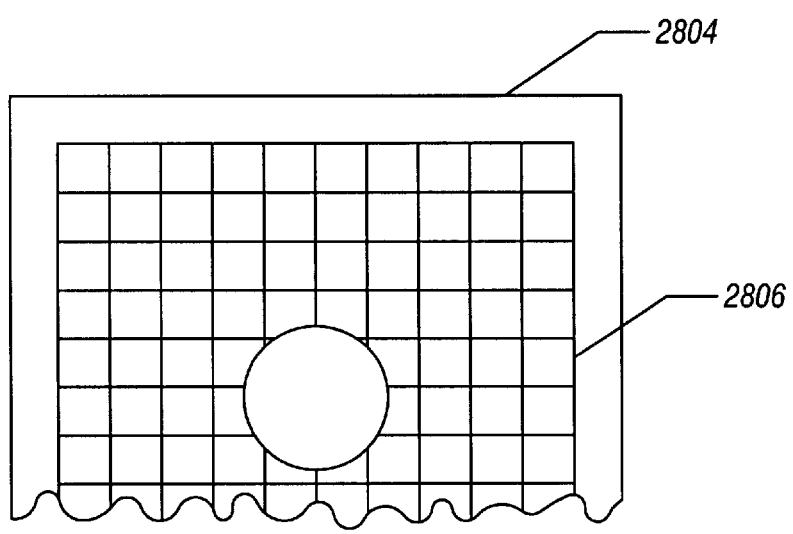
FIG. 28 shows a top view of a stage with a measurement grid, according to the present invention.

In a second embodiment, the magnification level is determined based on a measurement of the size of the actual field of view provided by the optical path 130. This size is determined based on recognition of measurement marks placed on the stage. FIG. 28 illustrates a top view of a portion of a stage 2804, similar to stage 104, but including a measurement grid 2806. Measurement grid 2806 is laid out in a predetermined measurement unit (e.g., 5 mm per grid line), such that magnification level determination software can determine the size of the field of view (and thus the magnification level of the optical path 130 being used). The magnification level determination software can be implemented as part of the imager circuit 140, or as part of the control program 600.

Figure 29:
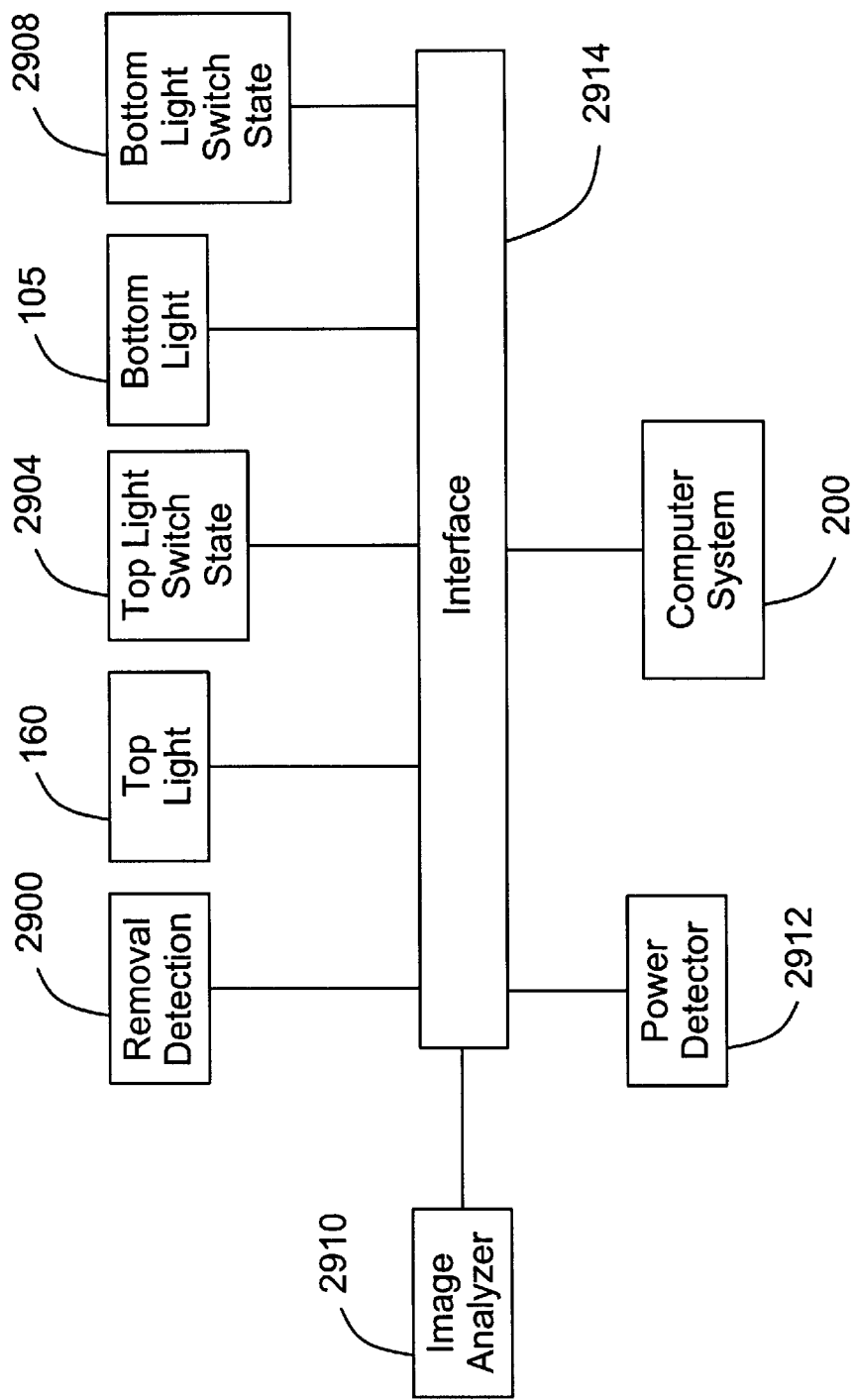
FIG. 29 is a block diagram of one embodiment of the present invention.

Referring to FIG. 29, computer system 200 is coupled to an interface 2914 that interfaces the system 200 with a plurality of components that provide control information to the computer system 200 or receive control information from the computer system 200 in one embodiment of the invention. For example, the interface 2914 is coupled to a top light 160 coupled to the imaging unit 102 and a bottom light 105 coupled to the base 101. Similarly, a top light switch state detector 2904 and a bottom light switch state detector 2908 detect the on or off states of the respective top light 160 and bottom light 105. Also coupled to the interface 2914 is a removal detection unit 2900 that detects when the imaging unit 102 is detached from the base 101. Also, an image analyzer 2910 analyzes information about the images that are captured by the imaging unit 102 to provide feedback for color balance determinations. In addition, a power detector 2912 determines the amount of power available for operating the lights 105 and 160 so that the computer system 200 may make adjustments as described hereinafter.

Figure 30:
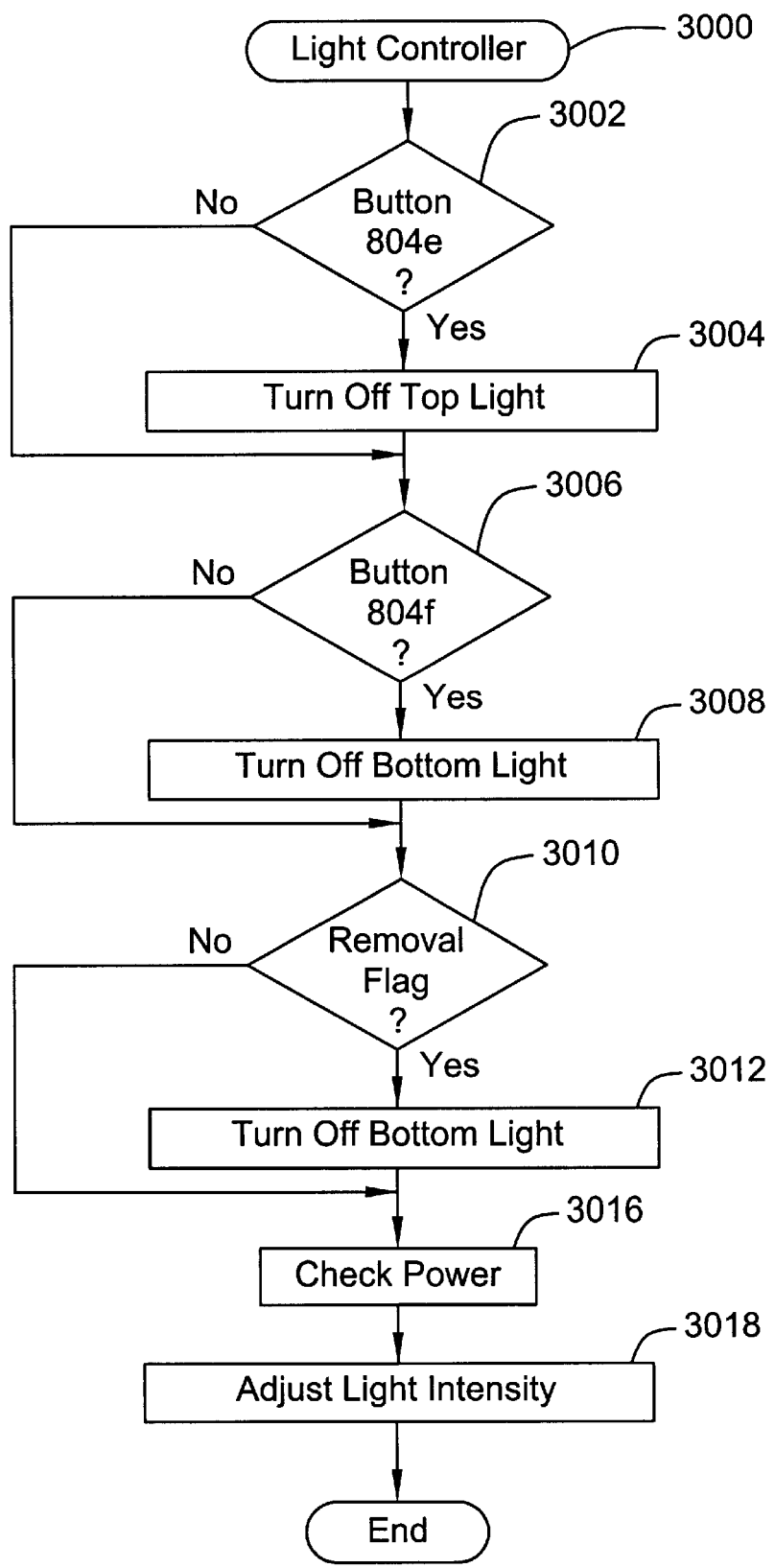
FIG. 30 is a flow chart for software for implementing a light controller in accordance with one embodiment of the present invention.

Turning next to FIG. 30, light controller software 3000 may be operative to control the states of the lights 105 and 160 in one embodiment of the invention. Initially, a check at diamond 3002 determines whether the button 804*e* is operated. If so, the top light 160 is turned off as indicated in block 3004. Next, a check at diamond 3006 determines if the button 804*f* has been operated. In such case, the bottom light 105 is turned off as indicated in block 3008.

A check at diamond 3010 determines whether a removal flag has been set. The removal flag is set when the removal detection circuit 2900 detects the removal of the imaging unit 102 from the base 101. The detection may include detecting the opening of the contacts 165 (FIG. 4).

If the removal flag is set, the bottom light 105 is automatically turned off as indicated in block 3012. This preserves the lifetime of the bottom light 105 and may allow additional power to be provided to the light 160 that accompanies the imaging unit 102 in some situations. In the same operation the top light 160 may automatically be turned on.

Next, the available power is checked as indicated in block 3016. In some cases, the available power is not sufficient to do all the different operations of the microscope and still power both the top light 160 and bottom light 105. For example power may be supplied to the imaging unit 102 and base 101 from a Universal Serial Bus (USB) power connection, which supplies relatively low power for communication. Based on the available power, the light intensity of one or more of the lights 105 and 160 may be adjusted or balanced as indicated in block 3018. Alternatively, one light may be powered off while the other is powered on.

Figure 31:
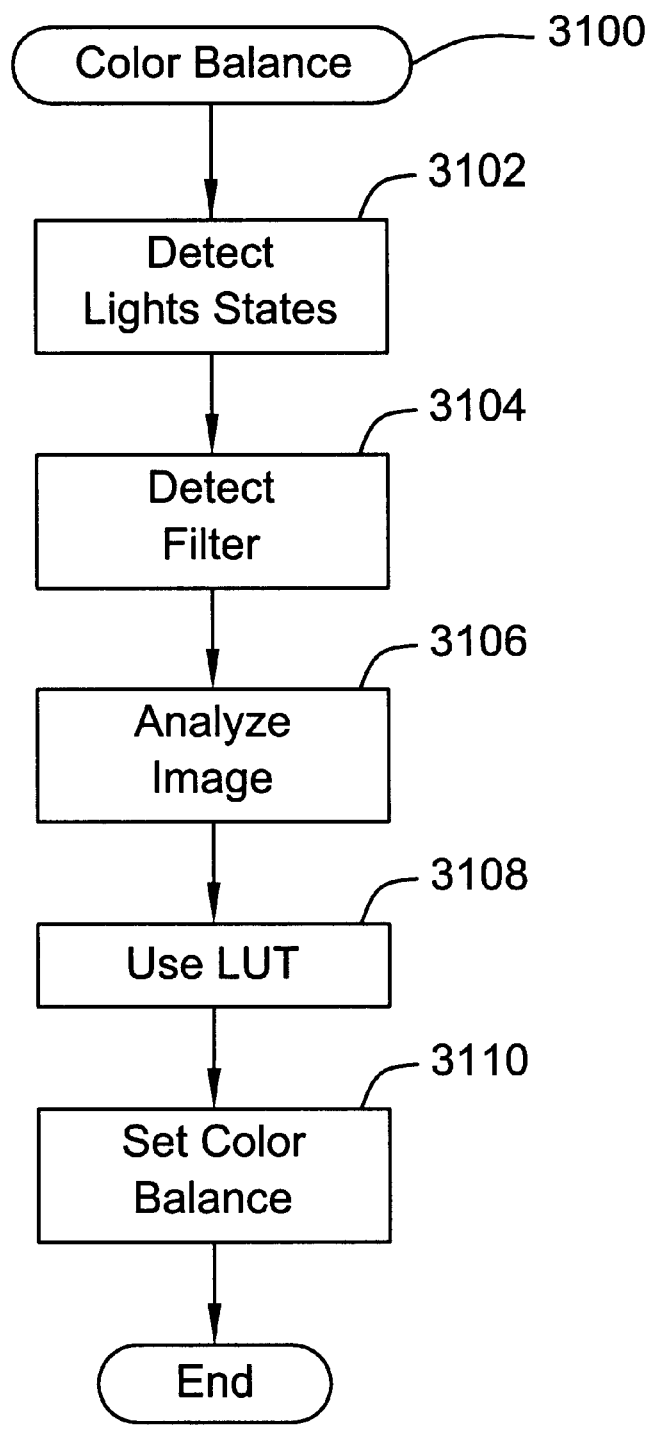
FIG. 31 is a flow chart for software for implementing a color balance feature in accordance with one embodiment of the present invention.

Turning next to FIG. 31, the color balance software 3100 is responsible for adjusting the color balance of the images produced by the microscope 100 based on a number of different factors. Initially, the on/off states of each of the lights 105 and 160 is determined as indicated in block 3102. In addition, the presence of any filters is determined as indicated in block 3104. Additional filters may be added to the bottom light source 105 or the top light source 160. This may be done by placing a filter on the stage 104 over the light 105 or by replacing the existing diffusing filter in the stage 104 itself. Using a filter may be advantageous in dark field microscopy and polarized light microscopy as two examples.

A check at block 3106 collects information from the image analyzer 2910. An analysis of the actual images that are being captured may be undertaken to obtain feedback on the lighting conditions. For example, it may be determined that the lights 105 or 160 are getting too old or a bulb is burning out and therefore adjustment of color balance may be needed. For example, if the imaged portion of the stage 104 is determined to be under or over exposed compared to prior images, lighting conditions may be compared. In some cases, it may be desirable to generate a message to the user to report poor light conditions.

Next, in block 3108, the parameters determined with respect to the on and off state of the lights, the presence or absence of filters, the particular types of lights utilized, whether artificial light is utilized, which lights are utilized and the image analysis may be applied to a look-up table (LUT) to determine how to re-align the color balance as indicated in block 3108. The color balance is set using all or part of this information as indicated in block 3110.

Figure 32:
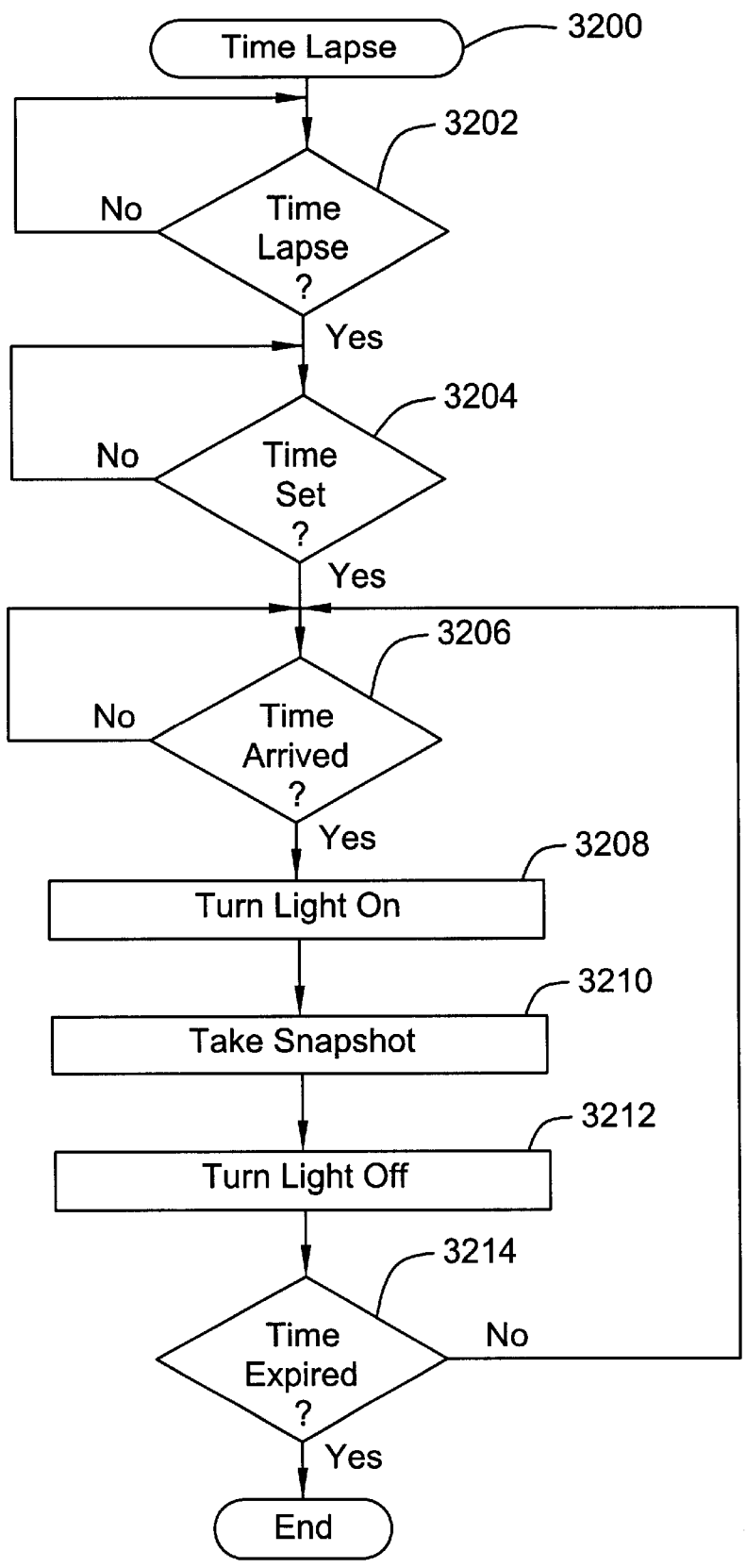
FIG. 32 is a flow chart for software for implementing a time lapse feature in accordance with one embodiment of the present invention.

Finally, turning to FIG. 32, the time lapse software 3200, in accordance with one embodiment of the present invention, initially determines whether the time lapse feature has been selected as indicated in diamond 3202. If so, a check at diamond 3204 determines whether a time has been set to determine the start time or duration time of the time lapse sequence as indicated in diamond 3204. If so, a check at diamond 3206 determines if the set time has arrived.

When the set time arrives, one or both lights 105 and 160 are automatically turned on as indicated in block 3208. A snapshot is automatically taken as indicated in block 3210. Thereafter, the lights are turned off as indicated in block 3212. A check at diamond 3214 determines whether the duration for the time lapse sequence has expired. If so, the flow ends. Otherwise, the flow cycles back to proceed through sequences of turning lights on, taking snapshots and turning lights off. As a result, the time lapse can be implemented in a hands free fashion and the user does not have to be present to make the snapshots or to control the lights in some embodiments. In between snapshots, the microscope 100 may be less obtrusive since the lights do not have to remain turned on.

Figure 33:
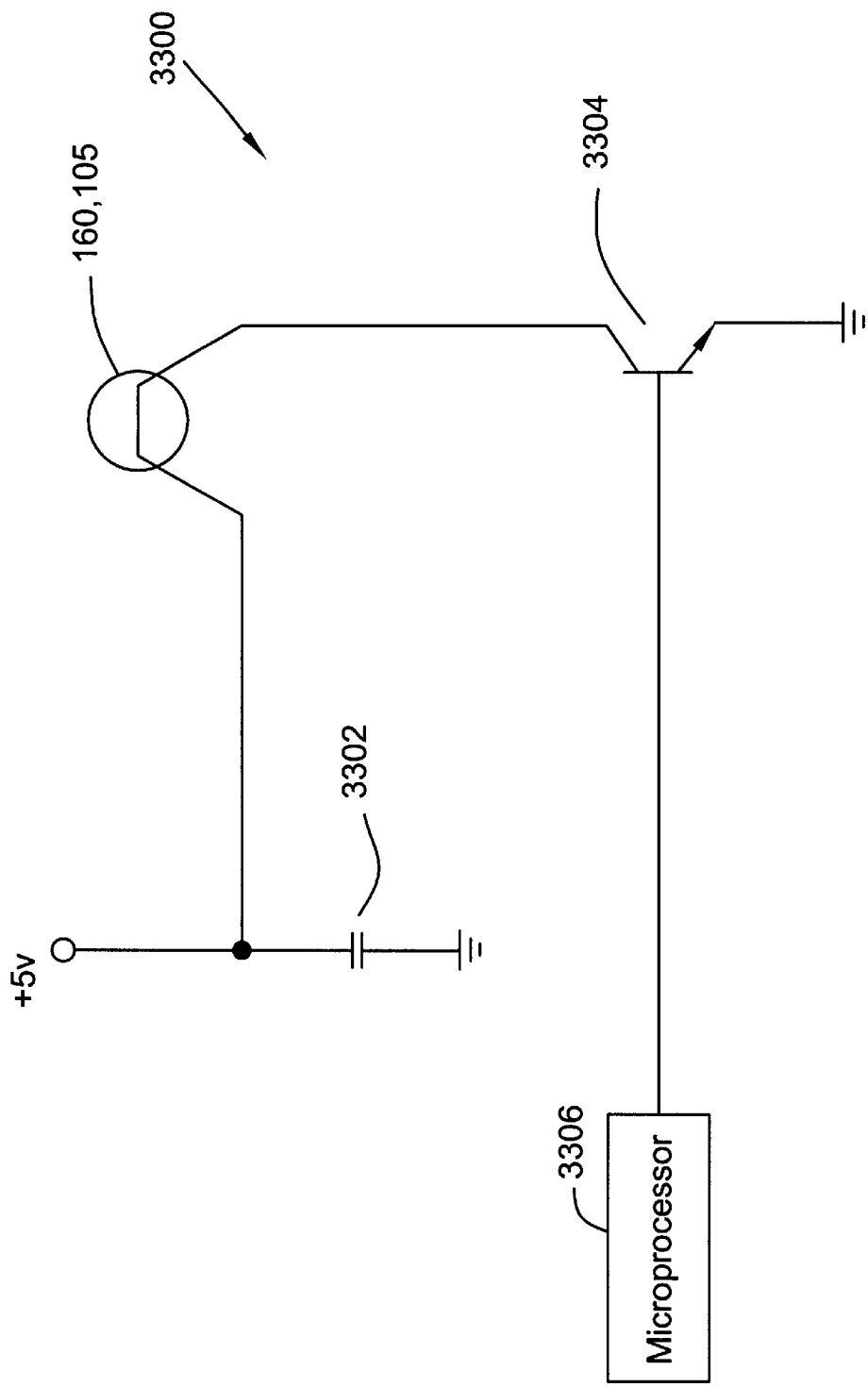
FIG. 33 is a flash circuit that may be used in one embodiment of the present invention.

Referring to FIG. 33, a flash circuit 3300 in accordance with one embodiment of the present invention may be utilized to provide a flash of light, for example for capturing snapshots. Even in situations where the power supply (indicated as five volts) is obtained through a USB connection, a capacitor 3302 may be utilized to produce an instant light source that may have an intensity greater than that of a normally powered lamp.

In the circuit 3300, the microprocessor 3306 turns the transistor 3304 on to discharge the capacitor 3302 through a light such as one of the top or bottom lights 160 and 105. When the power is applied, the capacitor 3302 is charged up. When it is desired to emit a flash, the capacitor 3302 may be discharged through the transistor 3304 to ground.

While the preceding discussion has referred to a top and a bottom light 160 and 105, one, two or more light bulbs may be utilized. In addition, the light bulbs may be provided by an auxiliary light source that is not physically connected to the-microscope 100 but may be electrically coupled thereto.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

removably supporting a microscope imaging unit on a base;

providing a first light coupled to said unit and a second light coupled to said base;

monitoring for removal of said unit from said base; and automatically turning said second light off in response to removal of said unit from said base.

2. The method of claim 1 including determining when said unit has been removed from said base by monitoring contacts between said unit and said base.

3. The method of claim 1 including providing a graphical user interface that allows the user to enter light control signals and determining whether the user has requested that one of said first or second lights be turned off, and in response to said request turning off the requested light.

4. The method of claim 1 further including adjusting the light intensity of said first and second lights based on the available power.

5. The method of claim 1 including monitoring the available power and determining whether to operate either of said first or second lights.

6. The method of claim 1 including monitoring the available power and determining whether to operate both of said first and second lights.

7. The method of claim 1 including determining whether said first or second light is on.

8. The method of claim 1 including turning on said first light in response to removal of said unit from said base.

9. A microscope comprising:

a microscope imaging unit;

a base removably supporting said microscope imaging unit;

a first light coupled to said unit and a second light coupled to said base;

a circuit to monitor for removal of said unit from said base; and a control circuit that automatically turns said second-light off in response to removal of said unit from said base.

* * * * *